United States Patent
Zinchenko et al.

(10) Patent No.: US 10,346,107 B2
(45) Date of Patent: Jul. 9, 2019

(54) METHODS AND APPARATUS FOR SITUATIONAL AND EVENT-DRIVEN DISCOVERY OPTIMIZATION OF PRINTING DEVICES

(71) Applicant: KYOCERA Document Solutions Inc., Osaka (JP)

(72) Inventors: Oleksandr Zinchenko, Concord, CA (US); Jette Cantiller, Hercules, CA (US); Oleksandr Osadchyy, Concord, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 103 days.

(21) Appl. No.: 15/583,900

(22) Filed: May 1, 2017

(65) Prior Publication Data

US 2018/0314476 A1    Nov. 1, 2018

(51) Int. Cl.
*G06F 3/12* (2006.01)

(52) U.S. Cl.
CPC ............ *G06F 3/1236* (2013.01); *G06F 3/121* (2013.01); *G06F 3/1231* (2013.01); *G06F 3/1232* (2013.01); *G06F 3/1288* (2013.01)

(58) Field of Classification Search
CPC ....... H04N 2201/0094; H04N 1/00344; H04N 1/00037; G06F 3/1203; G06F 3/1229; G06F 3/1293; G06F 3/121; G06F 3/1231; G06F 3/1232; G06F 3/1236; G06F 3/1288
USPC .......................................................... 709/224
See application file for complete search history.

(56) References Cited

U.S. PATENT DOCUMENTS

| | | | |
|---|---|---|---|
| 6,219,715 B1 | 4/2001 | Ohno et al. | |
| 7,358,502 B1 * | 4/2008 | Appleby | G03B 42/04 250/370.14 |
| 7,512,593 B2 * | 3/2009 | Karklins | G05B 19/05 |
| 7,788,355 B2 | 8/2010 | Maeda | |

(Continued)

OTHER PUBLICATIONS

Expert Health Data Programming,"What is Jenks Natural Breaks?", Aug. 12, 2014, available via the Internet at www.ehdp.com/vitalnet/breaks-1.htm (last visited Apr. 21, 2017).

(Continued)

*Primary Examiner* — Davoud A Zand
(74) *Attorney, Agent, or Firm* — McDonnell Boehnen Hulbert & Berghoff LLP

(57) ABSTRACT

Methods and apparatus for updating data for printing devices are provided. A device state management system (DSMS) can send probe messages to printing devices. The DSMS can receive responses to the probe messages, where the number of probe messages can exceed the number of responses. After receiving the responses, a number of unconfirmed printing devices can be determined based on data stored in a device database (DDB) associated with the DSMS. The DSMS can determine a system-instability value associated with the number of unconfirmed printing devices. The DSMS can determine whether the system-instability value exceeds a threshold. After determining that the system-instability value exceeds the threshold, the DSMS can: determine address clusters associated with the unconfirmed printing devices; send probe messages to addresses within at least one address cluster; receive responses to the probe messages; and update the DDB using data in the responses.

20 Claims, 14 Drawing Sheets

(56) References Cited

U.S. PATENT DOCUMENTS

| | | | | |
|---|---|---|---|---|
| 7,860,874 | B2* | 12/2010 | Karklins | G05B 19/05 700/83 |
| 8,949,382 | B2* | 2/2015 | Cornett | H04L 41/0806 709/220 |
| 9,755,887 | B1* | 9/2017 | Easttom | H04L 41/046 |
| 2002/0078131 | A1* | 6/2002 | Dowd | G06T 11/206 709/201 |
| 2004/0181712 | A1* | 9/2004 | Taniguchi | G06F 11/008 714/47.2 |
| 2006/0010230 | A1* | 1/2006 | Karklins | G05B 19/05 709/223 |
| 2007/0230463 | A1* | 10/2007 | Shima | H04L 43/0817 370/389 |
| 2009/0046317 | A1 | 2/2009 | Yoo | |
| 2011/0252248 | A1* | 10/2011 | Cameron | G06Q 10/04 713/300 |
| 2015/0363478 | A1* | 12/2015 | Haynes | G06F 16/26 707/625 |
| 2016/0092779 | A1* | 3/2016 | Werth | G06N 3/0445 706/48 |
| 2017/0006171 | A1* | 1/2017 | Kaneko | H04N 1/00464 |

OTHER PUBLICATIONS

J. Glass et al., "Vector Quantization and Clustering", Lecture #6, Automatic Speech Recognition Class 6.345, Spring 2003, Massachusetts Institute of Technology, available via the Internet at ocw.mit.edu/courses/electrical-engineering-and-computer-science/6-345-automatic-speech-recognition-spring-2003/lecture-notes/lecture6new.pdf (last visited Apr. 21, 2017).

Wikimedia Foundation, "Jenks Natural Breaks Optimization", Feb. 7, 2017, available via the Internet at en.wikipedia.org/w/index.php?title=Jenks_natural_breaks_optimization&oldid=764215955 (last visited Mar. 24, 2017).

* cited by examiner

DDB Format 114a

| Entry Name | IP Address | Device Name | State | Toner |
|---|---|---|---|---|
| ENTRY0 | DD_IP130 | PD130 | Confirmed | xx.x% |
| ENTRY1 | DD_IP142 | PD142 | Need Checking | yy.y% |
| ENTRY2 | DD_IP310 | PD310 | Need Checking | zz.z% |

DDB Format 114b

| Entry Name | IP Address | Serial No. | Model Name | State | Toner |
|---|---|---|---|---|---|
| ENTRY0 | DD_IP130 | xxxxxxxx | XXX | Confirmed | xx.x% |
| ENTRY1 | DD_IP142 | yyyyyyyy | YYY | Need Checking | yy.y% |
| ENTRY2 | DD_IP310 | zzzzzzzz | ZZZ | Need Checking | zz.z% |

DDB Format 114c

| Entry Name | IP Address | Serial No. | Model Name | Device Name | State | Toner |
|---|---|---|---|---|---|---|
| ENTRY0 | DD_IP130 | xxxxxxxx | XXX | XXX-xxxxxxxxx | Confirmed | xx.x% |
| ENTRY1 | DD_IP142 | yyyyyyyy | YYY | YYY-yyyyyyyyy | Need Checking | yy.y% |
| ENTRY2 | DD_IP310 | zzzzzzzz | ZZZ | ZZZ-zzzzzzzzz | Need Checking | zz.z% |

DDB Format 114d

| Entry Name | IP Address | Serial No. | Model Name | Device Name | State | Toner |
|---|---|---|---|---|---|---|
| ENTRY0 | DD_IP130 | xxxxxxxx | XXX | PD130 | Confirmed | xx.x% |
| ENTRY1 | DD_IP142 | yyyyyyyy | YYY | PD142 | Need Checking | yy.y% |
| ENTRY2 | DD_IP310 | zzzzzzzz | ZZZ | PD310 | Need Checking | zz.z% |

| DDB 114 | | | | |
|---|---|---|---|---|
| Entry Name | IP Address | Dev. Name | State | Page Count |
| ENTRY1 | DD_IP130 | PD130 | Need Checking | aaa |
| ENTRY2 | DD_IP142 | PD142 | Need Checking | bbb |
| ENTRY3 | DD_IP310 | PD310 | Need Checking | ccc |

| IPList 434 |
|---|
| IPList1_Add0 (for PD 310) |
| IPList1_Add1 (for PD 142) |
| IPList1_Add2 (for Device 410) |
| IPList1_Add3 (for Device 420 / PD 420) |

| DDB 114 | | | | |
|---|---|---|---|---|
| Entry Name | IP Address | Dev. Name | State | Page Count |
| ENTRY1 | DD_IP130 | PD130 | Need Checking | aaa |
| ENTRY2 | DD_IP142 | PD142 | Need Checking | bbb |
| ENTRY3 | DD_IP310 | PD310 | Confirmed | ccc |
| ENTRY4a | IPList1_Add1 | ---- | Need Checking | ---- |
| ENTRY5a | IPList1_Add2 | ---- | Need Checking | ---- |
| ENTRY6a | IPList1_Add3 | ---- | Need Checking | ---- |

| DDB 114 | | | | |
|---|---|---|---|---|
| Entry Name | IP Address | Dev. Name | State | Page Count |
| ENTRY1 | DD_IP130 | PD130 | Need Checking | aaa |
| ENTRY2 | DD_IP142 | PD142 | Need Checking | bbb |
| ENTRY3 | DD_IP310 | PD310 | Need Checking | ccc |

| IPList 434 |
|---|
| IPList1_Add0 (for PD 310) |
| IPList1_Add1 (for PD 142) |
| IPList1_Add2 (for Device 410) |
| IPList1_Add3 (for Device 420 / PD 420) |

| DDB 114 | | | | |
|---|---|---|---|---|
| Entry Name | IP Address | Dev. Name | State | Page Count |
| ENTRY1 | DD_IP130 | PD130 | Lost | aaa |
| ENTRY2 | DD_IP142 | PD142 | Confirmed | bbb |
| ENTRY3 | DD_IP310 | PD310 | Confirmed | ccc |
| ENTRY4 | DD_IP142 (IPList1_Add1) | PD142 | Confirmed | bbb |
| ENTRY5 | IPList1_Add2 |  | Deleted | ---- |
| ENTRY6 | IPList1_Add3 | PD420 | Confirmed | ddd |

FIG. 4H

METHODS AND APPARATUS FOR SITUATIONAL AND EVENT-DRIVEN DISCOVERY OPTIMIZATION OF PRINTING DEVICES

BACKGROUND

Printing devices have increased in number and geographic footprint throughout the world and have become increasingly connected to networks. These networks can include a print server. Typically, when one or more documents and/or other print data are scheduled to be printed, the print data is either directly sent to one printing device, or sent to a print server.

The networks can include many printing devices. Some or all of the printing devices can have different features, functions, and capabilities. For example, some printing devices print in color, while others do not. As another example, some printing devices are equipped with duplexing hardware that allows printing on both sides of a sheet of paper, while other printing devices can only print on one side of a sheet of paper.

SUMMARY

In one aspect, a method is provided. A device state management system, which includes software executing on a computing device, sends a plurality of probe messages to a plurality of printing device. The device state management system receives a plurality of response messages to the plurality of probe messages, where a number of the plurality of response messages is less than or equal to a number of the plurality of probe messages. After receiving the plurality of response messages, a number of unconfirmed printing devices is determined based on data stored in a device database associated with the device state management system. The device state management system determines a system-instability value associated with the number of unconfirmed printing devices. The device state management system determines whether the system-instability value associated with the number of unconfirmed printing devices exceeds a threshold system-instability value. After determining that the system-instability value exceeds the threshold system-instability value, the device state management system: determines one or more address clusters associated with unconfirmed printing devices, each address cluster including one or more addresses associated with one or more printing devices; sends one or more probe messages to one or more addresses within at least one of the one or more address clusters; receives one or more responses to the one or more probe messages; and updates the device database using data received in the one or more responses.

In another aspect, a computing device is provided. The computing device includes one or more processors and data storage. The data storage is configured to store computer-readable instructions. The computer-readable instructions include instructions for a device state management system that, when executed by the one or more processors, cause the computing device to perform tasks. The tasks include: sending a plurality of probe messages to a plurality of printing devices from the device state management system; receiving, at the device state management system, a plurality of response messages to the plurality of probe messages, where a number of the plurality of response messages is less than or equal to a number of the plurality of probe messages; after receiving the plurality of response messages, determining a number of unconfirmed printing devices based on data stored in a device database associated with the device state management system; determining a system-instability value associated with the number of unconfirmed printing devices using the device state management system; determining whether the system-instability value associated with the number of unconfirmed printing devices exceeds a threshold system-instability value using the device state management system; and after determining that the system-instability value exceeds the threshold system-instability value, the device state management system: determining one or more address clusters associated with unconfirmed printing devices, each address cluster including one or more addresses associated with one or more printing devices; sending one or more probe messages to one or more addresses within at least one of the one or more address clusters; receiving one or more responses to the one or more probe messages; and updating the device database using data received in the one or more responses.

In another aspect, an article of manufacture is provided. The article of manufacture includes non-transitory data storage storing at least computer-readable instructions that include instructions for a device state management system The computer-readable instructions, when executed by one or more processors of a computing device, cause the computing device to perform tasks. The tasks include: sending a plurality of probe messages to a plurality of printing devices from the device state management system; receiving, at the device state management system, a plurality of response messages to the plurality of probe messages, where a number of the plurality of response messages is less than or equal to a number of the plurality of probe messages; after receiving the plurality of response messages, determining a number of unconfirmed printing devices based on data stored in a device database associated with the device state management system; determining a system-instability value associated with the number of unconfirmed printing devices using the device state management system; determining whether the system-instability value associated with the number of unconfirmed printing devices exceeds a threshold system-instability value using the device state management system; and after determining that the system-instability value exceeds the threshold system-instability value, the device state management system determining one or more address clusters associated with unconfirmed printing devices, each address cluster including one or more addresses associated with one or more printing devices; sending one or more probe messages to one or more addresses within at least one of the one or more address clusters; receiving one or more responses to the one or more probe messages; and updating the device database using data received in the one or more responses.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 3C illustrates formats for a device database, according to an example embodiment.

FIGS. 4A, 4B, 4C, and 4D illustrate a scenario where data in a device database is refreshed, according to an example embodiment.

FIGS. 4E, 4F, 4G, and 4H illustrate another scenario where data in a device database is refreshed, according to an example embodiment.

DETAILED DESCRIPTION

Figure 1A:
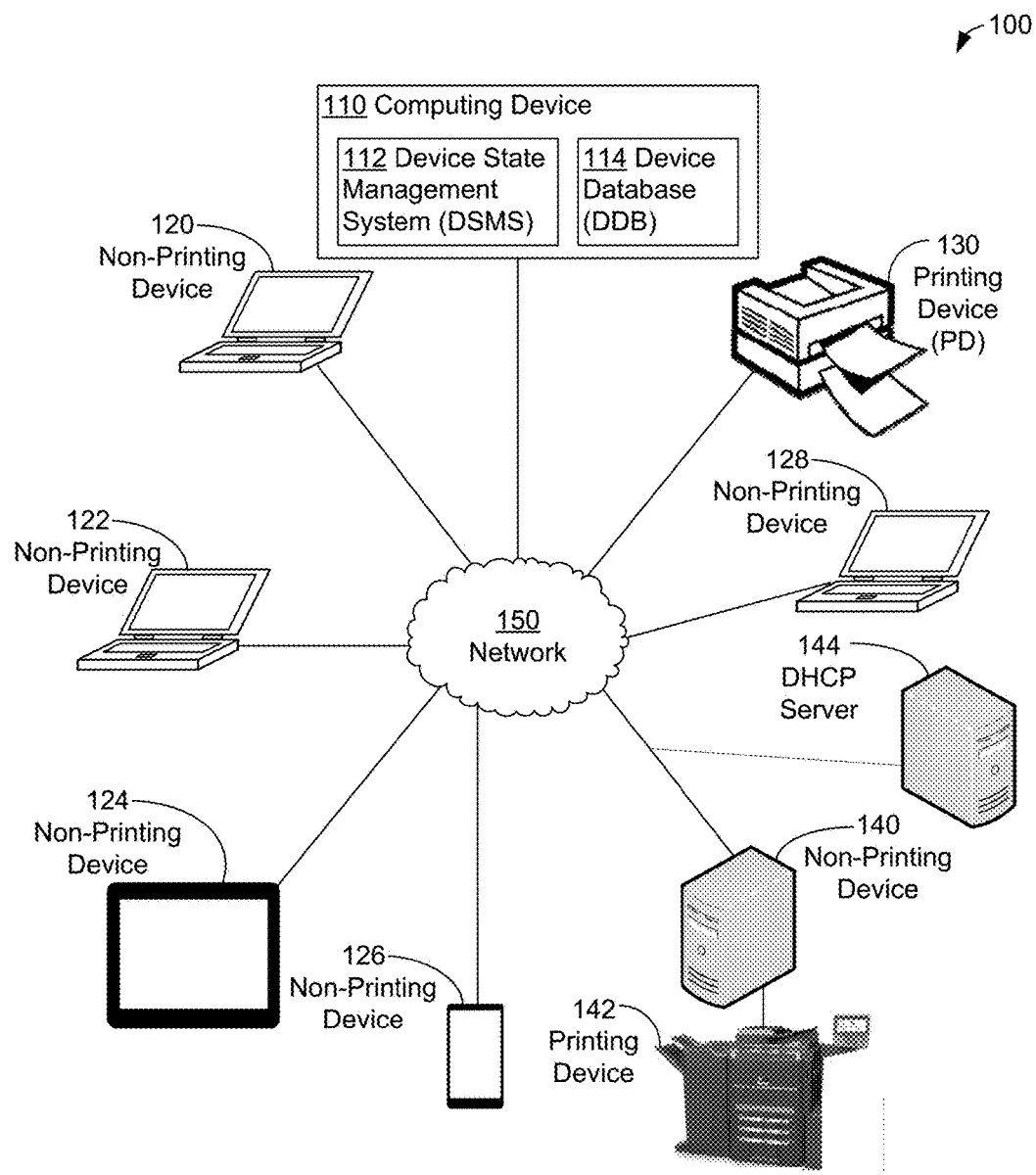
FIG. 1A is a diagram illustrating a printing network, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Techniques and apparatus for finding printing devices in a computing network are described. Some computing networks are large, complex networks connecting an extensive number of computing devices over one or more geographical regions, including printing devices; for example, a large corporation or governmental agency may utilize such computing networks. With the growth of a computing network, the corresponding infrastructure can become increasingly complicated and sophisticated, and include one or more network hierarchies designed to cover security, transparency and scalability requirements. For example, a complex computing network can have network hierarchies that include several interconnected network segments with multiple routers, switches and Dynamic Host Configuration Protocol (DHCP) servers. Such a computing network can include a large number, such as millions, of Internet Protocol (IP) addresses and obey very complicated rules for the IP address assignment. Those rules could be a part of sophisticated DHCP sector configuration or any other external subsystem that is responsible for IP address assignment and management. Such network hierarchies can be spread over many IP address segments.

When a new hardware and/or software is deployed in such kind of environment, quick and reliable printing device discovery techniques, as disclosed herein, can complement the consequent tasks of state monitoring and lifetime maintenance. These discovery techniques can monitor and track logical device locations, such as IP addresses. These techniques can be used in a variety of computing networks, including computing networks that include network hierarchies striving to produce optimal IP address allocation that may result in continuous IP address changes and switches of the hosts in the computing network.

For example, to administer a (complex) computing network, printing device information, such as device names, model numbers, serial numbers, Internet Protocol (IP) addresses, and/or other information related to printing devices can be stored in a device database (DDB) that can be maintained by a device state management system (DSMS).

The device database can store printing device information that can be used by the device state management system to maintain printing devices. For example, if the device database has data indicating a printing device is low on toner, then the device state management system can order toner for the printing device. However, if information in the database of printing device information is inconsistent, toner can be ordered for printing devices that have adequate supplies of toner and/or not ordered for printing devices that are nearly or completely out of toner. As another example, the device database can provide information used in providing feedback about a current status of one or more printing devices and in enabling near real-time or real-time reactions to printing device events.

Multiple situations can lead to the state of the device database, which can reflect current knowledge of the device state management system about printing devices, becoming unreliable. For example, if information in the device database becomes contradictory, the device state management system can correct the device database. Examples of contradictory information include, but are not limited to, situations where the device state management system: loses a connection with a printing device, detects that serial number or model name of a printing device has been changed, detects a network failure, critical device failure, or malfunction, detects that a newly-discovered printing device (i.e., a printing device without data already stored in the device database) has the same serial number as an already-known printing device (i.e., a printing device with data already stored in the device database), but the IP addresses differ between the newly-discovered printing device and the already-known devices, and detects other changes of printing device IP addresses.

The device database can be updated periodically (e.g., nightly) to address these contradictions and/or for other reasons; e.g., to record data for new printers. Some, but not all, printing devices have agents that can send a message to the device state management system when an IP address changes, when the printing device is disconnected, etc., so that the device state management system can update the device database appropriately. Since not all printing devices have agents, probe messages (or "probes" for short) can be used in situations where most if not all printing devices are to be discovered, such as discovering printing devices to maintain the printing device database mentioned above. A probe can be sent to the printing device, and the printing device can respond with some or all of the above-mentioned printing device information for the printing device.

If a response to a probe or "probe response" from a printing device includes data matching data stored in the device database for the printing device, the probe of the printing device can be considered to have succeeded. If no probe response is received by the device state management system or if a probe response has data that is inconsistent with the device database, the probe can be considered to have failed. In some cases, only a relatively-small amount of network traffic can be allocated to printing devices, so a failing probe may not be followed up for some time. Thus, the device database of printing device information can gradually become out of date until the failing probes are followed up.

Probes can fail for a variety of reasons. One reason for failing probes is that IP address information for printing devices changes over time. For example, if a printing device is shut down and then powered up, the printing device can ask a server, such as a DHCP server, to allocate an IP address for the printing device's use. The newly-allocated IP address may differ than a previously-allocated IP address used by the printing device prior to shut down. Another reason for failing probes that a printing device can be disconnected, perhaps being powered off, when the probe message is sent. For example, if a printing device is shut down at the end of a business day, and probes are sent during non-business hours, then a probe message sent to the shut-down printing device will fail as the shut-down printing device is disconnected from the network. Other reasons for failing probes are possible as well.

To maintain the device database, the device state management system can send probes to devices on the network, and receive corresponding probe responses. After receiving the probe responses, the device state management system can determine a number of unconfirmed printing devices. The device state management system can determine that a device D responding to a probe message is an unconfirmed printing device when either (1) data in D's probe response is contradictory to data stored in the device database or (2) device D did not respond to the probe. That is, device D can be labeled as an unconfirmed printing device if the probe for device D fails.

The data in a probe response can be contradictory to data stored in the device database for a number of reasons. For example, a probe response can include a serial number, model name, and a network/IP address for a printing device. But, the serial number and/or model name of a device DeviceA can be changed, such as when a new IP address was assigned to DeviceA by a DHCP server or a user, and the old IP address for DeviceA has been reassigned to a different DeviceB. Also, a serial number and/or model name of a device that is not found in the device database can be the serial number and/or model name of a new printing device. As another example, the IP address of a device DeviceC can be changed, where DeviceC has a record in the device database having the same serial number (and perhaps model name) matching the probe response. IP addresses can change for a number of reasons; e.g., use of a new or additional network adaptor, a different IP version (IPv4 or IPv6) was enabled, a new IP address was assigned to DeviceC by a DHCP server or a user.

The device state management system can determine a system-instability value associated with the number of unconfirmed printing devices using the device state management system. In one example, the system-instability value can be the number of unconfirmed printing devices. In another example, the system-instability value can be a sum or another mathematical combination of a number of activity levels of the number of unconfirmed printing devices. An activity level of a particular unconfirmed printing device UPD can be based on an amount of toner used by printing device UPD, values of counters, such as page counters, obtained from printing device UPD, numbers and/or types of alerts generated by printing device UPD, and combinations thereof.

More particularly, an activity level can be based on a rate of change of one or more values; e.g., if the device state management system determines that unconfirmed printing device UPD has a page counter of 1000 on day 1 and 1200 on day 2, then, the rate of change of these page counters indicates UPD prints 200 pages on this particular day. Then, the device state management system can determine the activity level for printing device UPD based on the 200 pages per day value. As another example, if a toner level for printing device UPD is 80% on day 1 and 78.3% on day 2, the activity level for printing device UPD can be based on a 1.7% decrease in toner levels for printing device UPD. Combinations, such as determining the activity level for printing device UPD based on the 200 pages/day and 1.7% change in toner levels, are possible as well. The use of activity levels in determining system-instability values can lead to an unequal weighting of unconfirmed printing devices; that is, some unconfirmed printing devices can have a large impact on system instability and some unconfirmed printing devices can have little or no impact on system instability. In an extreme case, having one on unconfirmed printing device with a high activity level can cause the system to be unstable. Other examples of system-instability values and activity levels are possible as well.

The device state management system can determine that the device database is unstable by determining that the system-instability value exceeds a threshold system-instability value. Otherwise, as the system-instability value does not exceed the threshold system-instability value, the device database can be considered to be stable and the device state management system can utilize the device database as is. For example, if the device state management system has data on N printing devices, N>0, the threshold system-instability value can be based on: a predetermined number of unconfirmed printing devices, such as 1, 10, 50, 66, 100, 500, a percentage of devices, such as 10% of N, 15% of N, 20% of N+1, and/or on one or more values determined using other techniques. As another example, a threshold system-instability value of a sum or another mathematical combination of activity levels of the predetermined number of unconfirmed printing devices; e.g., the threshold system-instability value can be a total of a number of pages/day, such as 10, 300, 5000, or 150,000 pages/day from the unconfirmed printing devices, a cumulative percentage or other change of toner levels, such as a 10%, 25%, 100%, 250%, 500% change of toner levels in the unconfirmed printing devices, a number of alerts, such as 1, 10, 25, 50, 100, 250, cumulatively received from the unconfirmed printing devices, etc. and combinations thereof. Other threshold system-instability values are possible as well.

To resolve contradictions between the device database and probe responses, the device state management system can discover missing devices and ensure that all known devices are connected and reachable. The discovery of missing devices can be performed using a preventive system maintenance discovery approach and/or a situational system stabilization discovery approach. For example, when the system-instability value is less than the system-instability threshold, the preventive system maintenance discovery approach can be used. The preventive system maintenance discovery approach can aim to minimize the number of potential system conflicts and prevent the situation when system state could be considered as unreliable. In other cases, such as when the system-instability value exceeds than the system-instability threshold, the situational system stabilization discovery approach can be used. The situational system stabilization discovery approach can aim to stabilize system state when the actual problem has happened and has not been detected and resolved using preventive system maintenance discovery.

The preventive system maintenance discovery approach can minimize possible conflicts and the cases when the state is not reliable the system need to have at least a minimal timely guarantee that the environment has not been changed or compromised. To minimize a number of possible conflicts, the device state management system can communicate with the device state monitoring system to one or more existing IP address assignment subsystems, such as binding and connecting with one or more DHCP servers to obtain one or more lists of network addresses, such as IP addresses, that may be associated with printing devices. After obtaining the list(s) of network addresses, the device state management system can compare IP/network addresses on the list(s) with known IP/network addresses stored in the device database.

The preventive system maintenance discovery approach can distinguish printing devices from other devices by IP address information. In some cases, printing devices are assigned specific ranges of IP addresses. These ranges of IP addresses can be provided to the device state management system by network-management personnel administering an IP network and/or printing devices in that network, but those ranges can change over time. Also, a printing device could be assigned to an IP address that is not in a provided range. When the device state management system is to use IP address ranges to discover printing devices, the device state management system can use this provided information supplemented by additional information, such as historical information about what IP address ranges were used by printing devices in the past and/or information about IP address ranges returned in responses to probe messages. Further, many non-printing devices do not provide serial number information, so printing devices can be distinguished by probe responses that include serial number information.

In some embodiments, the device state management system can execute on the same computing device as the DHCP server, and then some or all of the list(s) of network addresses can be retrieved using one or more configuration files. In other embodiments, the device state management system can execute on a different computing device as the DHCP server, and then some or all of the list(s) of network addresses can be retrieved using one or more network communication protocols (e.g., Hypertext Transport Protocol (HTTP), Extensible Messaging and Presence Protocol (XMPP), Simple Network Management Protocol (SNMP), telnet, File Transfer Protocol (FTP), Transmission Control Protocol (TCP), a socket-based communication protocol).

More particularly, the device state management system can connect to a DHCP server and retrieve the list of IP addresses that were allocated by and known to the DHCP server. Continuing with the preventive system maintenance discovery approach, the device state management system can compare the known IP addresses and the list of addresses that is returned from the DHCP server. If some unknown IP addresses are returned, they can be probed using a simple probing method, such as sending probe messages to each unknown IP address, as an unknown IP address could be an IP address of a (new) printing device. If probing of unknown IP addresses reveals that there are some known IP addresses that were not returned from the DHCP server and not previously resolved, these known IP addresses can be verified to ensure that the system has not lost a connection to those devices and the system state is accurate.

After determining that the system-instability value exceeds the threshold system-instability value, the device state management system can determine that the device database is unstable, and so is to be updated to account for the unconfirmed printing devices. When the device database is unstable, the situational system stabilization discovery approach can be used. The situational system stabilization discovery approach can efficiently recover the system state/update the device database to ensure the device database has complete and accurate information about printing devices.

In some cases, the preventive system maintenance discovery approach can be performed before the situational system stabilization discovery approach is used; for example, when the situational system stabilization discovery approach is invoked without prior execution of the preventive system maintenance discovery approach, with an intention that the preventive system maintenance discovery approach can put the device database into a stable state without actually invoking the situational system stabilization discovery approach The situational system stabilization approach can attempt to find all of the unconfirmed printing devices in the device databases. But, sending probe messages to all devices in a large network using sequential IP address probing can take a long period of time to find a new IP address of the device. That is, without optimization, sequential IP address probing for lost devices may be too expensive in large-scale systems (by full range probing) and/or too inconclusive (by single target probing or simple ranged targeted probing).

To optimize the number of probe messages sent to update the device database, the situational system stabilization approach can determine one or more address clusters associated with unconfirmed printing devices. For example, if a number of the unconfirmed printing devices are associated with a particular range of IP addresses, such as one or more particular contiguous subnets, each subnet having 256 IP addresses, then an address cluster can include part or all of the particular range of IP addresses.

In particular, a vector quantization technique can be applied to a list of the unconfirmed printing devices to maximize rediscovery of compromised devices and minimize ranges searched. The vector quantization method can organize IP addresses associated with unconfirmed printing devices into clusters based on their location on the IP address range, akin to numerical taxonomy. The vector quantization method can classify IP addresses associated with unconfirmed printing devices using k-means; that is, the clustering can sort a list of IP addresses associated with unconfirmed printing devices into k clusters. In some cases, the IP addresses associated with unconfirmed printing devices can be considered to be univariate (one-dimensional) data and so the Jenks natural breaks optimization that takes advantage of the sortable property of one-dimensional data can be used to cluster IP addresses.

Once IP addresses associated with unconfirmed printing devices have been clustered, the clusters can be evaluated for targeted discovery according to one or more properties of the address cluster. Example cluster properties for evaluation can include, but are not limited to:
    cluster range (number of IP addresses in the cluster),
    class size (number of unconfirmed printing devices found in this cluster),
    cluster density (ratio of class size to cluster range),
    history of instability (frequency of this cluster being compromised), and total active time (duration of device in device database before being considered as lost, compromised, or needing checking).

After determining address cluster(s) suitable for targeted discovery based on the cluster properties, the device state management system can send probes to IP addresses in the suitable address cluster(s), receive responses to the probes, and update the device database based on the probe responses. Thus, the device state management system can refresh/rebuild the device database using targeted discovery.

The herein-described techniques and apparatus allow for maintaining a device database for printing devices using a relatively-small amount of bandwidth. Most, if not all of herein-described techniques and apparatus, can be utilized when computing network traffic is expected and/or measured to be relatively low, reducing the impact on other computing network activities. These techniques and apparatus can concentrate probe messaging into address clusters that have a relatively-high number of failing probes, and so can efficiently obtain the information needed to maintain the device database by reducing the probes and probe response sent to devices in address ranges that are unlikely to yield usable information for maintaining the device database.

II. Printing System Examples

FIG. 1A is a diagram illustrating printing network 100, according to an example embodiment. Printing network 100 includes computing device 110, one or more non-printing devices 120, 122, 124, 126, 128, 140, DHCP server 144, and one or more printing devices (PDs) 130, 142 interconnected using network 150. In some examples, printing network 100 can have more, fewer, and/or different types of assessment devices, non-printing devices, and/or printing devices than indicated in FIG. 1.

Computing device 110, DHCP server 144, and/or non-printing devices 120, 122, 124, 126, 128 can be or include computing devices configured to communicate with each other and with printing devices 130, 142 using network 150. Computing device 110 can be a printing or non-printing device that includes software for device state management system (DSMS) 112 and/or data of device database (DDB) 114. Device state management system 112 can probe printing devices, receive probe responses, and collect other data to maintain device database 114. Device database 114 can include data for maintaining printing devices in printing network 100 and perhaps other networks—example data stored in device database 114 is discussed below in the context of at least FIGS. 3C, 4B, 4D, 4F, and 4H.

Printing devices 130, 142 can include devices configured to scan, print, copy, e-mail, account for, communicate and/or otherwise process documents and/or files that are originally available either on paper or electronically. In printing network 100, a non-printing device can be a computing device that is not a printing device, where the non-printing device can be configured to communicate with other non-printing devices and with printing devices 130, 142 using network 150.

After processing by one or more of printing devices 130, 142, the documents and/or files can be subsequently available either on paper or electronically, as requested. That is, printing devices 130, 142 can process a paper document PD or electronic document ED by at least: creating an electronic document ED1 representing the contents of PD (e.g., scan PD to create ED1), making one or more paper copies of PD, printing one or more copies of ED and/or ED1 on one or more types of paper, make one or more electronic copies of ED and/or ED1, change a format of ED and/or ED1 (e.g., perform OCR scanning, convert a file format used to store ED and/or ED1), maintain remotely-accessible storage (e.g., a document box) enabling other devices than printing devices 130, 142 to use/access ED and/or ED1, and/or communicate the contents of ED and/or ED1 to/from another device.

A document box can be storage allocated to an entity (e.g., a user, an administrator, a company, another type of entity) on a printing device, print server, or another device so the entity can keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage and usage limits.

In some embodiments, printing devices 130, 142 can perform other tasks and/or other processing as well. Printing devices 130, 142 can include products from various manufacturers with variations in color, speed, computing power, functionality, network connectivity, and/or other features.

In an example embodiment, some or all printing devices 130, 142 can be connected to network 150 through one or more, possibly different, network protocols. Data can be transmitted between printing devices 130, 142, non-printing devices 120, 122, 124, 126, 128, 140 over wired and/or wireless links between non-printing devices, printing devices, and network 150. The format of each respective data transmission between devices in printing network 100 can include one or more of a variety of different formats including: text formats, image formats, extensible mark-up language (XML), database tables, a flat file format, or another format. In some embodiments, a non-printing device can be configured to act as a print server for one or more printing devices. A print server can be configured to process jobs (e.g., spool job-related data, route jobs, provide user and/or server-related accounting for jobs, verify/enforce authentication and authorization rules related to jobs) and store data related to printing devices in printing network 100. For example, in network 140, non-printing device 140 is configured to be a print server for at least printing device 142.

Communications between the non-printing devices, and printing devices can include: computing device 110 and/or non-printing devices 120, 122, 124, 126, 128, 140 sending data for print jobs and/or print job portions for printing to printing devices 130, 142 and printing devices 130, 142 sending alert, status, error, and/or other messages to inform other devices about error or other conditions of the printing devices; e.g., idle, printing, sleeping, paper jam, low or out of paper, low or out of toner/ink, etc. Other communications between one or more computing devices, one or more non-printing devices, and one or more printing devices are possible as well; e.g., the communications described below related to device state management system 112 and/or device database 114.

DHCP server 144 can provide addressing information, such as IP addresses, to computing devices in network 150. In an example, let non-printing device 120 be powered down and later powered up. Upon power up, non-printing device 120 or network 150 can send a DHCP discover message to DHCP server 144 to request a new IP address for connecting to and using network 150 and/or other networks; e.g., the Internet. In response to the DHCP discover message, DHCP server 144 can allocate (or lease) an IP address for use by non-printing device 120, and send a DHCP offer message to non-printing device 120 that includes the newly-allocated IP address. Non-printing device 120 can accept the DHCP offer message and use the newly-allocated IP address to access. A similar process can be used by printing devices to obtain IP addresses from DHCP server 144.

Figure 1B:
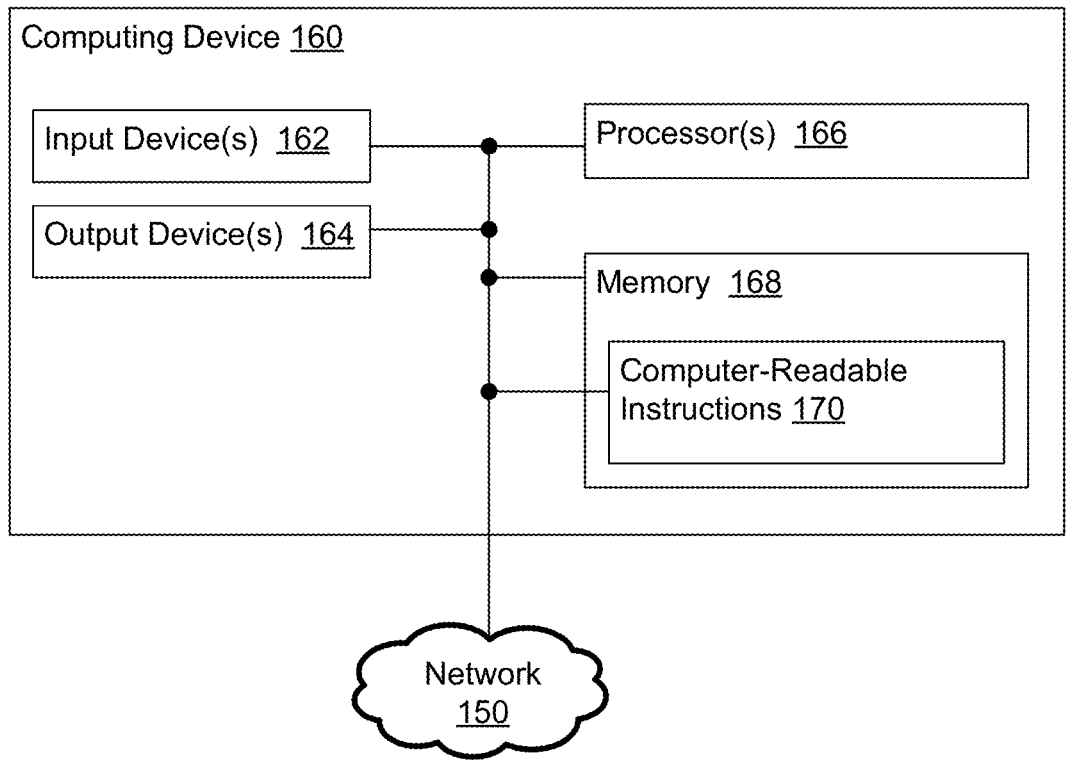
FIG. 1B is a schematic block diagram illustrating a computing device, according to an example embodiment.

FIG. 1B is a schematic block diagram illustrating computing device 160, according to an example embodiment. In some embodiments, computing device 160 can be configured to perform one or more herein-described functions of: printing network 100, computing device 110, device state management system 112, device database 114, device database formats 114a, 114b, 114c, 114d, non-printing devices 120, 122, 124, 126, 128, 140, printing devices 130, 142, 310, DHCP server 144, methods 200, 500, 600, devices 410, 420, IP list 434, clustered as well as at least part of the herein-described functionality related to scenarios 300, 400, 400a, and 580.

Computing device 160 can include one or more input devices 162, one or more output devices 164, one or more processors 166 and memory 168. Input devices 162 can include user input devices, network input devices, sensors, and/or other types of input devices. For example, input devices 162 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 150, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 150. Sensors can include devices configured to measure conditions in an environment of computing device 160 and provide data about that environment, such data including, but not limited to, location data, velocity (speed, direction) data, acceleration data, and other data about the environment for computing device 160. Example sensors include, but are not limited to, GPS sensor(s), location sensors(s), gyroscope(s), accelerometer(s), magnetometer(s), camera(s), light sensor(s), infrared sensor(s), and microphone(s). Other input devices 162 are possible as well.

Output devices 164 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 150, and/or wireless network transmitters and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 150. Other types of output devices can include, but are not limited to, vibration devices, haptic feedback devices, and non-visible light emission devices; e.g., devices that emit infra-red or ultra-violet light. Other output devices 164 are possible as well.

Processors 166 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processors 166 can be configured to execute computer-readable program instructions 170 that are contained in memory 168 and/or other instructions as described herein.

Memory 168 can include non-transitory machine-readable storage configured to store data and/or instructions. In some examples, memory 168 can store part or all of the data of device state management software 112 and/or device database 114. In other examples, memory 168 can store machine-readable instructions 170 that, when executed by processor(s) 166, can cause a computing device to perform herein-described functions, such as but not limited to, functions of herein-described devices, networks, methods, features, and scenarios. In particular, computer-readable program instructions 170 can include at least some instructions for and/or related to device state management software 112 and/or device database 114.

Figure 2A:
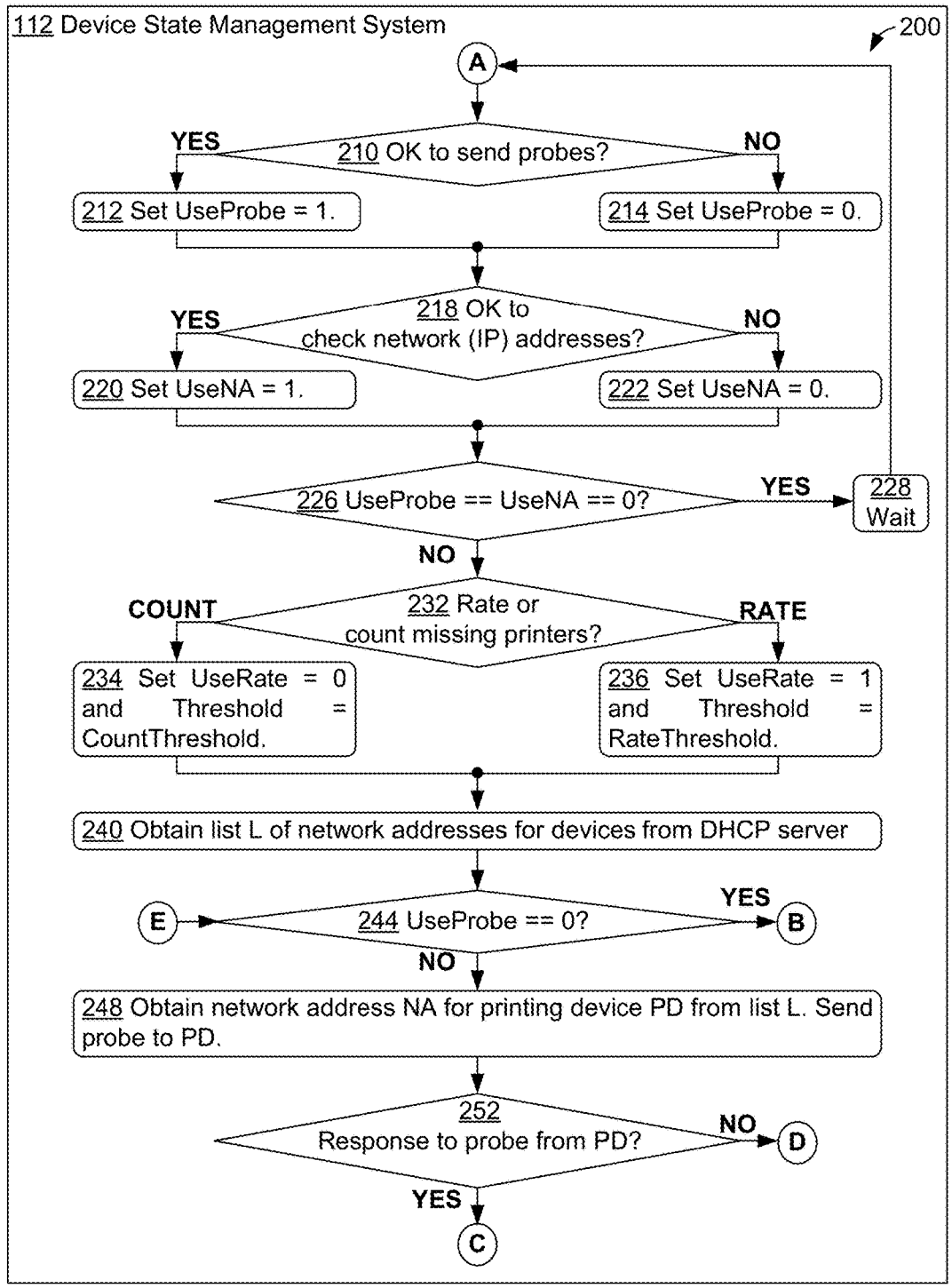
FIGS. 2A and 2B are a flowchart for a method related to discovering networked printing devices using a device state management system, according to an example embodiment.
Figure 2B:
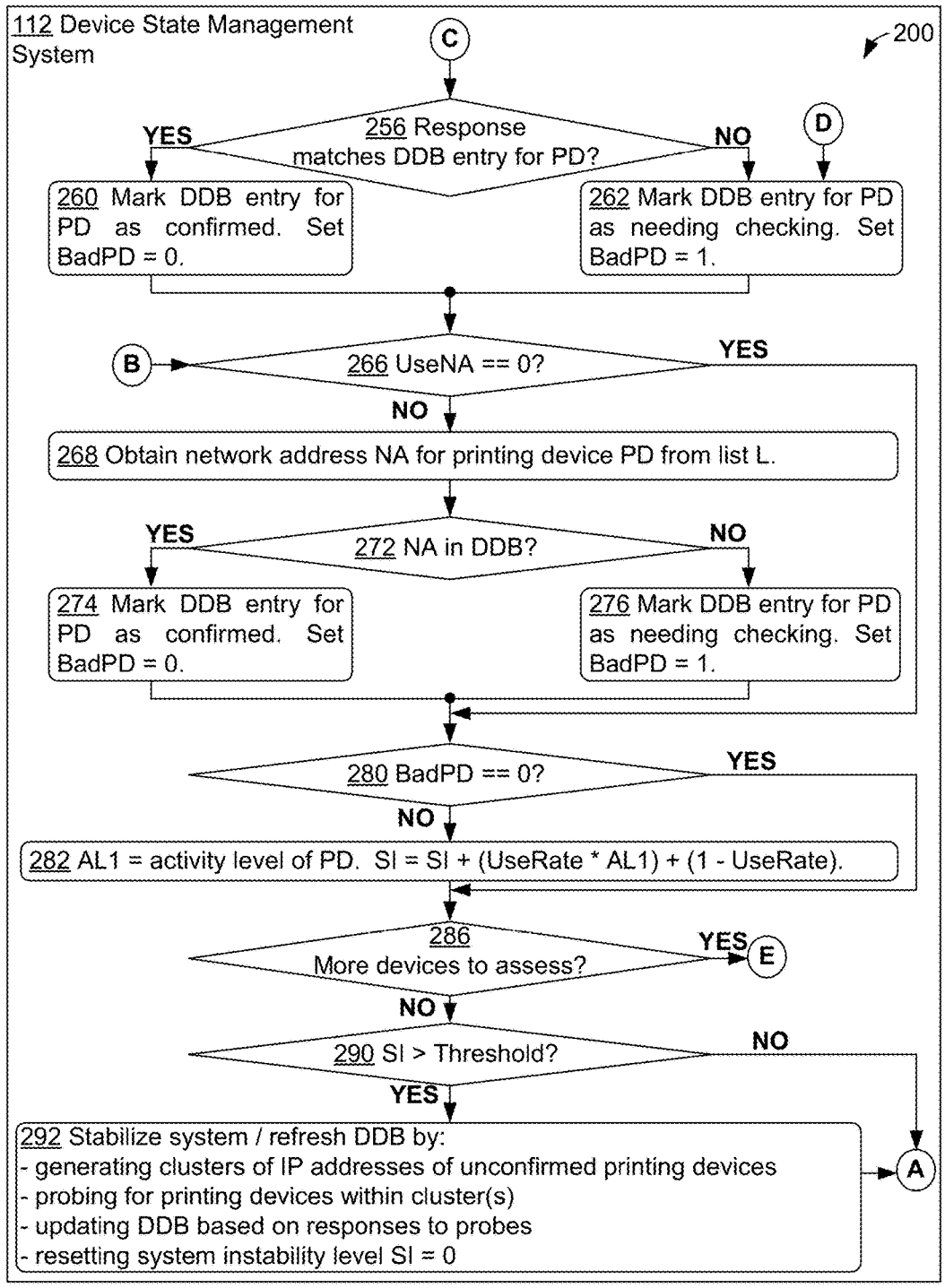

III. Apparatus and Methods for Finding Printing Devices and Updating Device Data FIGS. 2A and 2B are a flowchart for a method 200 related to discovering networked printing devices using a device state management system, according to an example embodiment. Method 200 can be executed by a device state management system, such as device state management system 112. The device state management system can be or include software executed by a computing device, such as computing device 110 discussed above in the context of FIG. 1A and/or computing device 160 discussed above in the context of FIG. 1B.

FIG. 2A shows that method 200 can begin at block 210, which is associated with label "A", where the device state management system can determine whether or not to send probes as part of discovering networked printing devices. For example, the above-mentioned preventive system maintenance discovery approach does not involve sending probes, while the above-mentioned situational system stabilization discovery approach does involve sending probes.

If the device state management system determines that sending probes is part of discovering networked printing devices at this time, the device state management system can proceed to block 212. Otherwise, the device state management system determines that sending probes is not part of discovering networked printing devices at this time and the device state management system can proceed to block 214.

At block 212, the device state management system can set a UseProbe variable equal to 1 to indicate that sending probes is part of discovering networked printing devices at this time. For example, invoking the situational system stabilization discovery approach can lead to execution of block 212 and setting UseProbe=1. After completing block 212, the device state management system can proceed to block 218.

At block 214, the device state management system can the UseProbe variable equal to 0 to indicate that sending probes is not part of discovering networked printing devices at this time. For example, invoking the preventive system maintenance discovery approach can lead to execution of block 214 and setting UseProbe=0. After completing block 214, the device state management system can proceed to block 218.

At block 218, the device state management system can device state management system can determine whether or not to check IP addresses as part of discovering networked printing devices. If the device state management system determines that checking IP addresses is part of discovering networked printing devices at this time, the device state management system can proceed to block 220. Otherwise, the device state management system determines that checking IP addresses is not part of discovering networked printing devices at this time and the device state management system can proceed to block 222.

At block 220, the device state management system can set a UseNA variable equal to 1 to indicate that checking IP addresses is part of discovering networked printing devices at this time and can proceed to block 226.

At block 222, the device state management system can set the UseNA variable equal to 0 to indicate that checking IP addresses is not part of discovering networked printing devices at this time.

At block 226, the device state management system can determine whether both the UseProbe and UseNA variables are both equal to 0. If both the UseProbe and UseNA variables are both equal to 0, then neither probing nor IP checking is to be performed at this time, indicating that discovering networked printing devices is not to be performed at this time. Then, if both the UseProbe and UseNA variables are both equal to 0, the device state management system can proceed to block 228. Otherwise, at least one of the UseProbe and UseNA variables is not equal to 0, and the device state management system can proceed to block 232.

At block 228, the device state management system can wait for a period of time; e.g., 1 minute, 3 hours, ½ day, 21 hours, 1 day. After waiting for the period of time, the device state management system can proceed to block 210. In some embodiments, method 200 can end at block 228 instead of waiting for a period of time.

At block 232, the device state management system can determine whether to rate or count missing printing devices. Rating missing printers involves determining activity levels for ""missing" or unconfirmed printing devices, and then mathematically combining the activity levels for unconfirmed printing devices to determine a system-instability value, as discussed above. Counting missing printing devices involves maintaining a number of unconfirmed printing devices and utilizing the number of unconfirmed printing devices as a system-instability value, as also discussed above.

If the device state management system is to count missing/unconfirmed printing devices, the device state management system can proceed to block 234. Otherwise, the device state management system is to rate missing/unconfirmed printing devices and the device state management system can proceed to block 236.

At block 234, the device state management system can set a UseRate variable equal to 0 and set a Threshold variable equal to a CountThreshold value. The Threshold variable of method 200 can be used as a threshold system-instability level to determine whether or not the device database is unstable, as discussed above. As an example of determining the CountThreshold value, let the device state management system have data on N printing devices, N>0, in the device database. Then, the CountThreshold value can be based on: a predetermined number of unconfirmed printing devices, such as 1, 10, 50, 66, 100, 500, a percentage of devices, such as 10% of N, 15% of N, 20% of N+1, and/or on one or more values determined using other techniques, as discussed above. Other techniques for determining the CountThreshold value are possible. Upon completion of the procedures of block 234, the device state management system can proceed to block 240.

At block 236, the device state management system can set a UseRate variable equal to 1 and set a Threshold variable equal to a RateThreshold value. As an example, the RateThreshold value can be based on one or more activity levels, such as a cumulative number of pages printed by the missing/unconfirmed printing devices per day (or other time period), a cumulative amount of toner used or percentage of toner used by the missing/unconfirmed printing devices, a cumulative number of alerts received by and/or from by the missing/unconfirmed printing devices, and/or combinations thereof as discussed above. Other techniques for determining the RateThreshold value are possible.

At block 240, the device state management system can obtain a list L of network addresses from a DHCP server, such as DHCP server 144.

At block 244, which is associated with label "E", the device state management system can determine whether the UseProbe variable equals 0. If the UseProbe variable does equal 0, the device state management system can proceed to block 266, which is associated with label "B". Otherwise, as the UseProbe variable does not equal 0, the device state management system can proceed to block 248.

The procedures of blocks 248, 252, 256, 260, and 262 relate to discovery techniques utilizing probe messages. At block 248, the device state management system can obtain a network address NA for printing device PD from list L. Then, the device state management system can send a probe to network address NA for printing device PD.

At block 252, the device state management system can determine whether there is a response to the probe sent at block 248 from printing device PD. If the device state management system has received a response to the probe, the device state management system can proceed to block 256, which is associated with label "C". Otherwise, the device state management system has not received a response to the probe and the device state management system can proceed to block 262, which is associated with label "D".

Turning to FIG. 2B, at block 256, which is associated with label "C", the device state management system can determine whether data in the probe response from printing device PD matches data stored in the device database. If the data in the probe response from printing device PD matches data stored in the device database, the device state management system can proceed to block 260. Otherwise, data in the probe response from printing device PD does not match data stored in the device database and the device state management system can proceed to block 262.

At block 260, the device state management system can mark the device database entry for printing device PD as being confirmed. Also, the device state management system can set a BadPD variable equal to 0, indicating that current printing device PD is not an unconfirmed or "bad" printing device. Upon completion of the procedures of block 260, the device state management system can proceed to block 266.

At block 262, which is associated with label "D", the device state management system can mark the device database entry for printing device PD as "needing checking" or unconfirmed. Also, the device state management system can set the BadPD variable equal to 1, indicating that current printing device PD is an unconfirmed/bad printing device.

At block 266, which is associated with label "B", the device state management system can determine whether the UseNA variable is set to 0. If the UseNA variable does equal 0, the device state management system can proceed to block 280. Otherwise, as the UseNA variable does not equal 0, the device state management system can proceed to block 268.

The procedures of blocks 268, 272, 274, and 276 relate to discovery techniques utilizing checking IP addresses of list L with data stored in the device database. These discovery techniques do not require use of probe messages as indicated below. At block 268, the device state management system can obtain a network address NA for printing device PD from list L.

At block 272, the device state management system can determine whether there is an entry in the device database associated with network address NA. If there is an entry in the device database associated with network address NA, the device state management system can proceed to block 274. Otherwise, no entry in the device database is associated with network address NA and the device state management system can proceed to block 276

At block 274, the device state management system can mark the device database entry for printing device PD as being confirmed. Also, the device state management system can set the BadPD variable equal to 0, indicating that current printing device PD is not an unconfirmed/bad printing device. Upon completion of the procedures of block 274, the device state management system can proceed to block 280.

At block 276, the device state management system can mark the device database entry for printing device PD as "needing checking" or unconfirmed. Also, the device state management system can set the BadPD variable equal to 1, indicating that current printing device PD is an unconfirmed/bad printing device.

At block 280, the device state management system can determine whether the BadPD variable has a value of 0; i.e., current printing device PD is not an unconfirmed/bad printing device. If the BadPD variable has a value of 0, the device state management system can proceed to block 286. Otherwise, the BadPD variable has a non-zero value; i.e., current printing device PD is an unconfirmed/bad printing device, and the device state management system can proceed to block 282.

At block 282, the device state management system can determine an activity level value AL1 for printing device PD. Then, the device state management system can update a system-instability value SI using the following equation: SI=SI+((UseRate)*AL1)+(1−UseRate), as indicated in FIG. 2B. In method 200, UseRate has a value of either 0 or 1, as discussed above in the context of blocks 234 and 236. Then, if UseRate=0, the equation: SI=SI+((UseRate)*AL1)+(1−UseRate) simplifies to be SI=SI+(1+UseRate)→SI=SI+1, and thus SI will be incremented to update a count of unconfirmed printing devices. If UseRate=1, the equation: SI=SI+((UseRate)*AL1)+(1−UseRate) simplifies to be SI=SI+(UseRate*AL1)+0→SI=SI+AL1, and thus SI will be updated by summing the previous value of SI with the AL1 value to update a sum of activity levels of unconfirmed printing devices.

At block 286, the device state management system can determine whether there are more devices to assess; e.g., whether all addresses in list L have been checked, whether all entries in the device database have been marked as either confirmed or needing checking, whether time and/or other resources allocated to execution of method 200 have been consumed, etc. If there are more devices to assess, the device state management system can proceed to block 244, which is associated with label "E". Otherwise, there are no more devices to assess and the device state management system can proceed to block 290.

At block 290, the device state management system can determine whether the system-instability value SI is greater than the Threshold value. If SI is greater than Threshold, the device state management system can proceed to block 292. Otherwise, SI is not greater than Threshold and the device state management system can proceed to block 210, which is associated with label "A".

At block 292, the device state management system can stabilize the system by refreshing the device database. Refreshing the device database can include generating clusters of IP addresses associated with unconfirmed printing devices, probing for printing devices within the generated clusters, updating the device database based on probe responses, and resetting the system instability level SI to 0. Stabilizing the system and refreshing the device database are also discussed below in at least in the context of method 500 and FIGS. 5A and 5B. The stabilized/refreshed device database can be used to perform printer-related functions, such ordering replaceable supplies (e.g., toner) for a printing device based on data stored in the stabilized/refreshed device database, checking device status, and/or other functions. Upon completion of the procedures of block 292, the device state management system can proceed to block 210, which is associated with label "A".

Figure 3A:
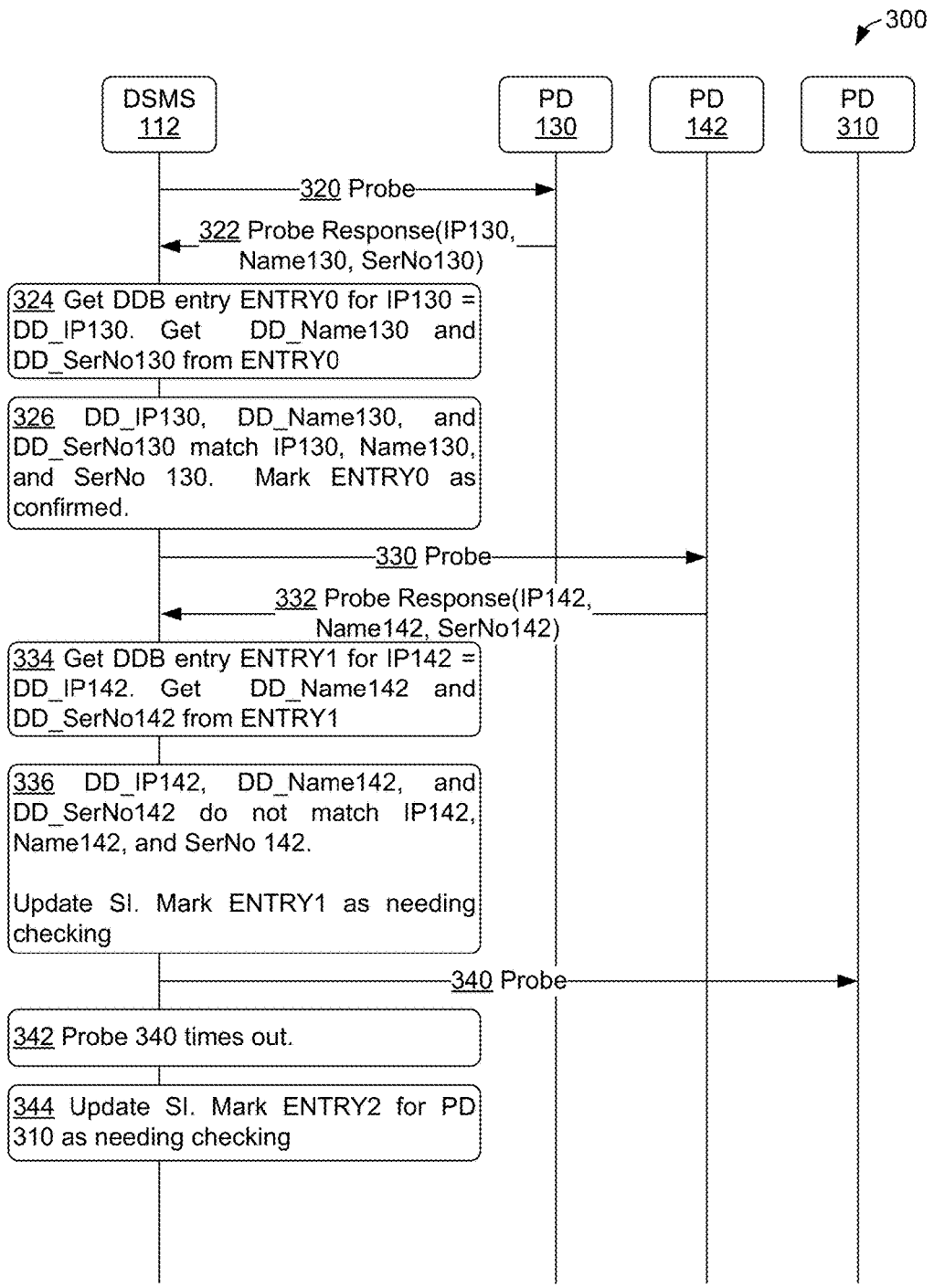
FIGS. 3A and 3B illustrate a scenario where a printing system is determined to be unstable and a device database is refreshed during system stabilization, according to an example embodiment.
Figure 3B:
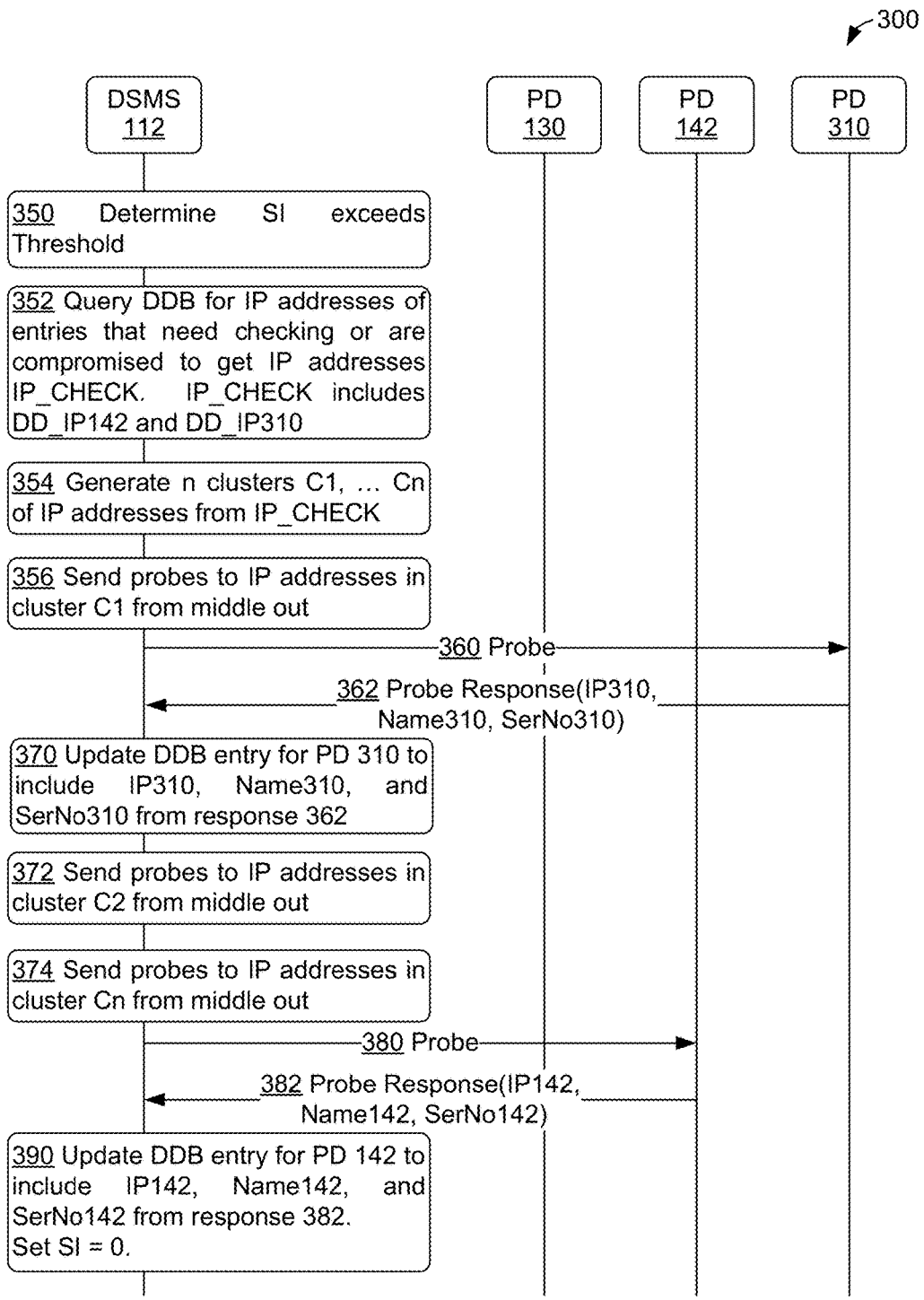

FIGS. 3A, 3B, and 3C illustrate scenario 300 where a printing system similar to printing network 100 is determined to be unstable and a device database is refreshed during system stabilization, according to an example embodiment. Scenario 300 can involve device state management system 112 following method 200 where the UseNA variable is set to 0 and the UseProbe variable is set to 1; that is, probes are used to determine whether the device database is up to date.

In scenario 300, device state management system 112 sends probes to printing devices 130, 142, and 310. In scenario 300, the probe to printing device 130 returns information that is consistent stored in the device database, and so an entry for printing device 130 in the device database is marked as confirmed. The probe sent to printing device 142 returns information that is inconsistent with the device database, and so an entry for printing device 142 in the device database is marked as needing checking and system-instability value SI is updated. The probe sent to printing device 310 times out without a response, and so an entry in the device database for printing device 310 is marked as needing checking and system-instability value SI is updated.

In scenario 300, the system-instability value SI exceeds the threshold, and so device state management system 112 gets IP addresses from the device database that need checking or are compromised and clusters the returned IP addresses. Device state management system 112 then sends probes to the devices in the clusters of IP addresses— sending these probes includes sending probes to printing devices 140 and 310. Subsequently, device state management system 112 updates the device database according to the probe responses and resets the system-instability value SI to 0.

Scenario 300 involves device state management system 112 executing method 200. Prior to the onset of scenario 300, the UseNA variable was set to 0, the UseProbe variable was set to 1, and list L was obtained from DHCP server 144. FIG. 3A shows that scenario 300 begins with device state management system 112 generating and sending probe 320 to printing device 130. Printing device 130 then generates and sends probe response 322 to device state management system 112, where probe response 322 includes an IP address "IP130", a model name "Name130", and a serial number "SerNo130". In other scenarios, a probe response, such as probe response 322, can include less, more, and/or different information about a device, such as printing device 130; e.g., a device name, a domain name such as a Fully Qualified Domain Name (FQDN), software, hardware, memory and/or firmware information, other address information than an IP address such as but not limited to Media Access Control (MAC) and/or Ethernet address information, one or more timestamps, hash sum/parity checking information.

Upon reception of probe response 322, device state management system 112 can perform the procedures of block 324 to get an entry "ENTRY0" from the device database for a device having an IP address of "IP130".

FIG. 3C illustrate formats 114a, 114b, 114c, 114d for a device database. Each of formats 114a, 114b, 114c, 114d is shown storing three entries for the three printing devices of scenario 300. Each of device database formats 114a, 114b, 114c, and 114d has: (1) "Entry Name" information to name the three entries as "ENTRY0", "ENTRY1", and "ENTRY2"; (2) respective "IP Address[es]" of "DD_IP130", "DD_IP142", and "DD_IP310"; (3) respective "State[s]" of each entry of "Confirmed", "Need Checking", and "Need Checking", and (4) respective "Toner" values of "xx.x %", "yy.y %", and "zz.z %". In some embodiments, some or all of formats 114a, 114b, 114c, 114d may not include an Entry Name and/or replace the Entry Name with a numerical, other alphanumeric, and/or binary key.

The Toner value for a printing device can be an example device activity level for the printing device. Other example device activity levels for the printing device include: values of counters, such as page counters, obtained from the printing device, numbers and/or types of alerts generated by the printing device, rates of change of these values (e.g., a daily toner usage rate, a number of pages printed per week determined based on differences in page counter values) and combinations thereof. In some embodiments, some or all of these device activity levels can be stored in device database 114.

Device database format 114a, illustrated in an upper portion of FIG. 3C, also includes a "Device Name" for each entry—the respective device names for entries ENTRY0, ENTRY1, and ENTRY2 are "PD130", "PD142", and "PD310". Device database format 114d, illustrated in a lower portion of FIG. 3C, also includes the same device names as shown in device database format 114a. An upper-central portion of FIG. 3C shows that device database format 114b includes "Serial No." and "Model Name" information along with the above-mentioned Entry Name, IP Address, and State information. Device database formats 114b and 114c (which is illustrated in a lower-central portion of FIG. 3C) both have "Serial No." information for respective entries ENTRY0, ENTRY1, and ENTRY2 of "xxxxxxxxx", "yyyyyyyy", and "zzzzzzzz", and both have respective "Model Name" information for the respective entries of "XXX", "YYY", and "ZZZ". Device database format 114c also includes "Device Name" information for respective entries ENTRY0, ENTRY1, and ENTRY2 of "XXX-xxxxxxxxx", "YYY-yyyyyyyy", and "ZZZ-zzzzzzzz"—that is, the Device Names in device database format 114c are a concatenation of a respective model name, a "-" character, and a respective serial number. As such, in other scenarios, either the serial number and model name information or the device name information used in device database format 114c can be removed as redundant. Other device database formats than 114a-114d are possible as well; e.g., format 114a can store model names along with or instead of device names.

In scenario 300, the device database 114 uses device database format 114d.

Returning to block 324 of FIG. 3A, as ENTRY0 is found in device database 114 as a match for IP address "IP130", then IP address "IP130" matches the IP address "DD_IP130" stored in the device database for ENTRY0. In scenario 300, device database 114 stores ENTRY0 with a serial number of "xxxxxxxxx" and a model name of "XXX". Device state management system 112 retrieves the "xxxxxxxxx" serial number from device database 114 as a variable "DD_Name130", and retrieves the "XXX" model name as a variable "DD_SerNo130".

At block 326, device state management system 112 compares the IP130, Name130, and SerNo130 information from probe response 322 with respective information DD_IP130, DD_Name130, and DD_SerNo130 information from device database 114 and determines that the probe response information matches the device database information for printing device 130/ENTRY0. Device state management system 112 then marks ENTRY0 of device database 114 as "Confirmed" as indicated in FIG. 3C.

FIG. 3A shows that scenario 300 continues with device state management system 112 generating and sending probe 330 to printing device 142. Printing device 142 then generates and sends probe response 332 to device state management system 112, where probe response 332 include an IP address "IP142", a model name "Name142", and a serial number "SerNo142".

Upon reception of probe response 332, device state management system 112 can perform the procedures of block 334 to get an entry "ENTRY1" from device database 114 for a device having an IP address of "IP142". In scenario 300, ENTRY1 of device database 114 includes a serial number of "yyyyyyyy" and a model name of "YYY". Device state management system 112 stores the "yyyyyyyy" serial number from device database 114 in a variable "DD_Name142", and the "YYY" model name in a variable "DD_SerNo142".

At block 336, device state management system 112 compares the IP142, Name142, and SerNo142 information from probe response 332 with respective information DD_IP142, DD_Name142, and DD_SerNo142 information from device database 114 and determines that the probe response information does not match the device database information for printing device 132/ENTRY1. Device state management system 112 then marks ENTRY1 of device database 114 as "Need[s] Checking" as indicated in FIG. 3C.

As part of the procedures of block 336, device state management system 112 then updates system-instability value SI to indicate the printing network is more unstable since the data for received in probe response 332 for printing device 142 is inconsistent with data stored in device database 114. In scenario 300, missing printers are counted, so the UseRate variable of method 200 is set to 0, and the CountThreshold variable is set to 1. Then, device state management system 112 updates system-instability value SI by incrementing SI to be equal to 1.

Scenario 300 continues with device state management system 112 generating and sending probe 340 to printing device 310. In scenario 300, printing device 310 is powered down when probe 340 is sent, and so printing device 310 does not respond to probe 340.

At block 342, device state management system 112 times out waiting for a response to probe 340. At block 344, in accordance with method 200, an entry ENTRY2 in device database 114 for printing device 310 is marked as "Need[s] Checking" as indicated in FIG. 3C. As part of the procedures of block 344, device state management system 112 then updates system-instability value SI to indicate the printing network is more unstable since no probe response was received for printing device 310. At this stage of scenario 300, device state management system 112 updates system-instability value SI by incrementing SI to be equal to 2.

Turning to FIG. 3B, at block 350, device state management system 112 determines that system-instability value SI of 2 exceeds the Threshold value of 1.

At block 352, device state management system 112 queries device database 114 for entries that need checking or are compromised; i.e., entries whose State field is equal to "Need Checking" or "Compromised". At least entries ENTRY1 and ENTRY2 are retrieved from device database 114 as a result of this query. From the retrieved entries, device state management system 112 selects the IP addresses stored in the IP address field of the entries to form a list of IP addresses "IP_CHECK". As such, IP_CHECK includes the IP addresses DD_IP142 and DD_IP310.

At block 354, device state management system 112 generates n clusters, C1, C2 . . . Cn, n>0, of IP addresses from the IP_CHECK list generated at block 352. The clusters can be generated using a vector quantization technique, such as a natural breaks technique as discussed in more detail below in the context of at least FIGS. 5A and 5B.

At block 356, device state management system 112 selects cluster C1 to send probes and sends probes to IP addresses in cluster C1 from the middle out. For example, let cluster C1 include a range of IP addresses [IP_LOW, IP_HIGH], IP_HIGH>IP_LOW. Then, device state management system 112 can determine a midpoint address in this range IP_MID=(IP_LOW+IP_HIGH)/2. Then to send probes from the middle out of cluster C1, device state management system 112 can send probes to IP addresses as follows: send a first probe to midpoint address IP_MID, send a second probe to IP address IP_MID+1 (or IP_MID−1), send a third probe to IP address IP_MID−1 (or IP_MID+1), send a fourth probe to IP address IP_MID+2 (or IP_MID−2), send a fifth probe to IP address IP_MID−2 (or IP_MID+2), and so on until finally sending probes to IP address IP_HIGH and IP_LOW (or vice versa).

As part of sending probes to IP addresses in cluster C1, device state management system 112 generates and sends probe message 360 to printing device 310. In response, printing device 310 generates and sends probe response 362 to device state management system 112. Probe response 362 includes an IP address "IP310", a model name "Name310", and a serial number "SerNo310".

At block 370, device state management system 112 updates entry ENTRY2 of device database 114 for printing device 310 with the data from probe response 362; e.g., IP address IP310, model name Name310, and serial number SerNo310. That is, device state management system 112 writes into device database 114: the value IP310 into the IP Address field of entry ENTRY2, the value Name310 into the Model Name field of entry ENTRY2 and the value SerNo310 into the Serial No. field of entry ENTRY2. In some examples, device state management system 112 can write a state field of entry ENTRY2 in device database 114 with a "Confirmed" (or similar) value. Scenario 300 continues with device state management system 112 finishing sending probes to cluster C1.

At block 372, device state management system 112 selects cluster C2 to send probes and sends probes to IP addresses in cluster C2 from the middle out. Sending probes to IP addresses from the middle out of a cluster is discussed above with regards to block 356.

At block 374, device state management system 112 selects cluster Cn to send probes and sends probes to IP addresses in cluster Cn from the middle out. Sending probes to IP addresses from the middle out of a cluster is discussed above with regards to block 356.

As part of sending probes to IP addresses in cluster Cn, device state management system 112 generates and sends probe message 380 to printing device 142. In response, printing device 142 generates and sends probe response 382 to device state management system 112. Probe response 382 includes an IP address "IP142", a model name "Name142", and a serial number "SerNo142".

At block 390, device state management system 112 updates entry ENTRY1 of device database 114 for printing device 140 with the data from probe response 382; e.g., IP address IP142, model name Name142, and serial number SerNo142. That is, device state management system 112 writes into device database 114: the value IP142 into the IP Address field of entry ENTRY1, the value Name142 into the Model Name field of entry ENTRY2 and the value SerNo142 into the Serial No. field of entry ENTRY1. In some examples, device state management system 112 can write a state field of entry ENTRY1 in device database 114 with a "Confirmed" (or similar) value Scenario 300 continues with device state management system 112 finishing sending probes to cluster Cn. As cluster Cn is the last cluster of the clusters generated at block 354, a discovery process begun at block 350 after SI was determined to be greater than Threshold can be completed, and so the system-instability value SI can be set to 0. Upon completion of the procedures of block 390, scenario 300 can be completed.

FIGS. 4A, 4B, 4C, and 4D illustrate scenario 400 where data in a device database is refreshed, according to an example embodiment. In scenario 400, the herein-described preventive system maintenance discovery approach is used to refresh data in device database 114, which utilizes a device database format similar to format 114a, except that toner values used in format 114a are replaced by page count values. In the context of related method 200, the UseNA variable is set to 1, and the UseProbe variable is set to 0.

Device database 114 stores data about a printing system similar to printing network 100 that three printing devices: printing device 142, printing device 410, and printing device 420. The contents of device database 114 at the onset of scenario 400 are shown in FIG. 4B.

Scenario 400 starts with device state management system 112 requesting IP addresses from DHCP server 144, which are provided to device state management system 112 from DHCP server 144 as a list "IPList". After receiving IPList, device state management system 112 integrates IPList into device database 114. As part of integrating IPList into device database 114, device state management system 112 adds new entries for three IP addresses not already present in device database 114 and updates state information for existing entries based on IPList.

Figure 4A:
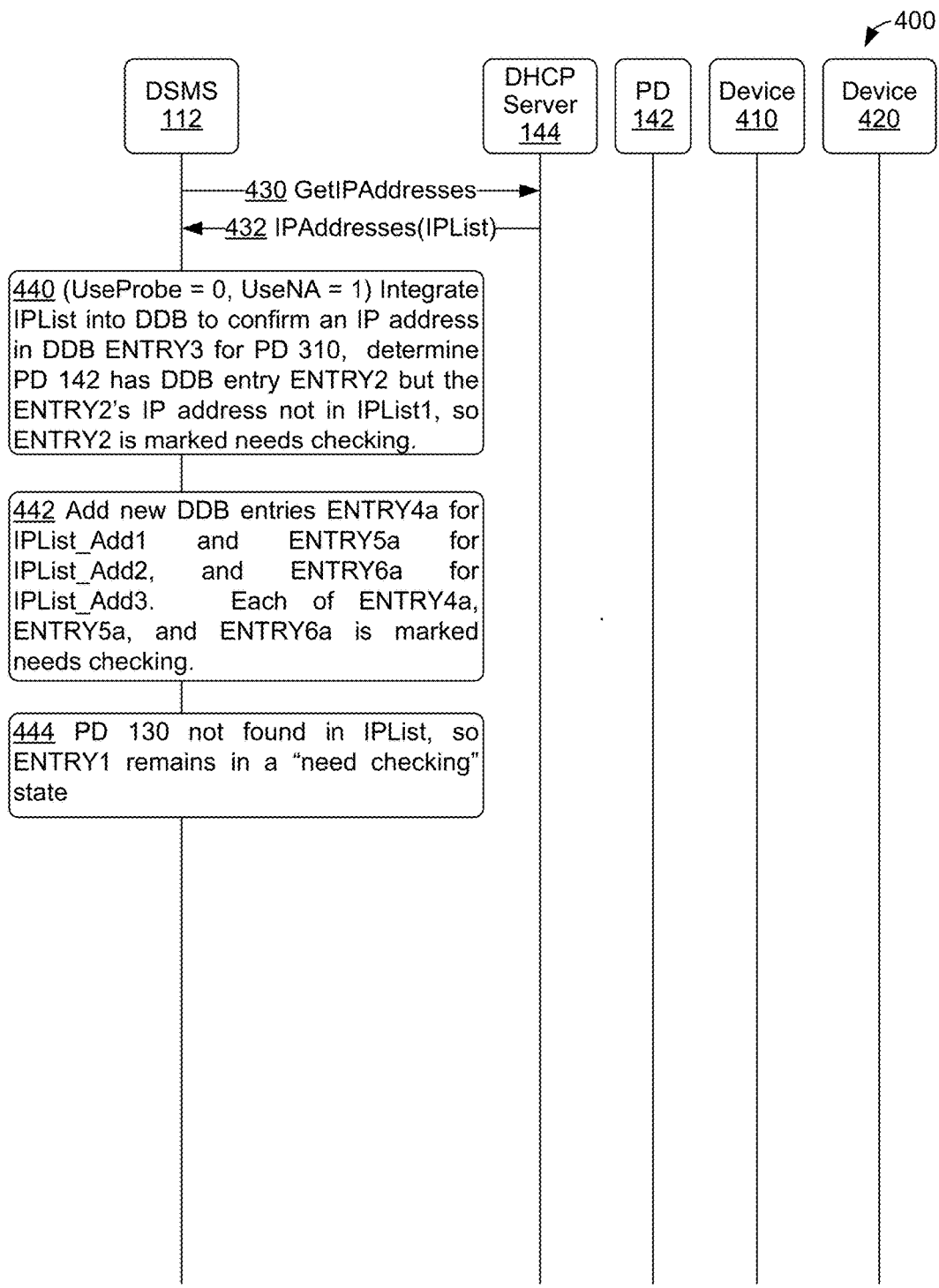

FIG. 4A shows that scenario 400 begins with device state management system 112 generating and sending GetIPAddresses message 430 to DHCP server 144. In response to GetIPAddresses message 430, DHCP server 144 generates and sends IPAddresses message 432 with a list of IP addresses "IPList" that are known to DHCP server 144.

Upon reception of IPAddresses message 432, device state management system 112 carries out the procedures of block 440 to integrate IPList into device database 114. To integrate IPList into device database 114, device state management system 112 can query device database 114 with each IP address in IPList to determine whether or not there exists an entry in device database 114 for the queried-for IP address. If such an entry exists, that entry can be considered to be confirmed. Otherwise, as no entry exists for the queried-for IP address, device state management system 112 can add an entry to device database 114 for the queried-for IP address FIG. 4B shows contents of device database 114 prior to the integration of IPList. In particular, device database 114 includes three entries "ENTRY1", "ENTRY2", and "ENTRY3" which store respective IP addresses of "DD_IP130", "DD_IP142", and "DD_IP310", respective device names "PD130", "PD142", and "PD130", respective states of "Need Checking", "Need Checking", and "Need Checking", and respective "Page Count" values of "aaa", "bbb", and "ccc".

FIG. 4C shows the contents of IPList that were returned in IPAddresses message 432 as IPList 434. IPList 434 includes four IP addresses: "IPList1_Add0", which is an IP address for printing device 310, "IPList1_Add1", which is an IP address for printing device 142, "IPList1_Add2", which is an IP address for device 410, and "IPList1_Add3", which is an IP address for device 420. In scenario 400, device 410 is a non-printing device, and device 420 is a printing device, as indicated by the "Device 420/PD420" annotation of the IPList1_Add3 IP address. Note that the parenthetical annotations shown in FIG. 4C are not part of IPList 434 as provided in IPAddresses message 432; rather, these annotations are provided in FIG. 4C for illustrative purposes only. In some examples, IPList 434 can have actual IP addresses in IPv4 format with values such as shown in Table 1 below:

TABLE 1

| IP Address Name in IPList 434 | Actual IP Address |
|---|---|
| IPList1__Add0 | 10.10.100.34 |
| IPList1__Add1 | 10.10.100.37 |
| IPList1__Add2 | 10.10.100.44 |
| IPList1__Add3 | 10.10.120.119 |

In other examples, IPList 434 can have actual IP addresses in IPv6 or perhaps another format.

Returning to FIG. 4A, device state management system 112 queries device database for IPList1_Add0 from IPList and finds entry ENTRY3 having IP address DD_IP310 that equals IPList1_Add0. As device database 114 has ENTRY3 corresponding to IPList1_Add0 from IPList, device state management system 112 marks a state of ENTRY3 as "Confirmed".

At block 442, device state management system 112 adds three new entries to device database 114. More specifically, device state management system 112 queries device database 114 for IPList1_Add1 from IPList and does not find a specific entry for IPList1_Add1. In scenario 400, both IPList1_Add1 from IPList and ENTRY2 in device database 114 are associated with printing device 142, but IPList1_Add1 differs from DD_IP142 stored with ENTRY2 of device database 114. As such, the query for IPList1_Add1 in device database 114 fails. As device database 114 does not have an entry corresponding to IPList1_Add1 from IPList, device state management system 112 adds an entry "ENTRY4a" to device database 114 with an IP address of IPList1_Add1, a state of "Need Checking", and sets the device name and page count fields to default values represented as " - - - " in FIG. 4C.

Then, device state management system 112 queries device database 114 for IPList1_Add2 from IPList and does not find a specific entry for IPList1_Add2. In scenario 400, neither IPList1_Add2 nor the associated device 410 is represented by data in device database 114. As such, the query for IPList1_Add2 in device database 114 fails. As device database 114 does not have an entry corresponding to IPList1_Add2 from IPList, device state management system 112 adds an entry "ENTRY5a" to device database 114 with an IP address of IPList1_Add2, a state of "Need Checking", and sets the device name and page count fields to default values.

Additionally, device state management system 112 queries device database 114 for IPList1_Add3 from IPList and does not find a specific entry for IPList1_Add3. In scenario 400, neither IPList1_Add3 nor the associated device 420 is represented by data in device database 114. As such, the query for IPList1_Add3 in device database 114 fails. As device database 114 does not have an entry corresponding to IPList1_Add3 from IPList, device state management system 112 adds an entry "ENTRY6a" to device database 114 with an IP address of IPList1_Add3, a state of "Need Checking", and sets the device name and page count fields to default values.

FIG. 4C shows device database 114 after ENTRY6a has been added—five of the six entries in device database 114 have a state of "Need Checking". In some scenarios, device database 114 can be considered to be unstable at this stage of scenario 400 as ⅚ths of the data in device database 114 is marked as needing checking.

At block 444 of FIG. 4A, it can be determined that no IP address in IPList corresponds to DD_IP130, which is the IP address for ENTRY1, and thus the state of ENTRY1 can remain as "Need Checking". Upon completion of the procedures of block 444, scenario 400 can be completed.

FIGS. 4E, 4F, 4G, and 4H illustrate scenario 400a where data in a device database is refreshed, according to an example embodiment. In scenario 400a, the herein-described situational system stabilization discovery approach is used to refresh data in device database 114, which utilizes a device database format similar to format 114a, except that toner values used in format 114a are replaced by page count values. In the context of related method 200, the UseNA variable is set to 0, and the UseProbe variable is set to 1.

Scenario 400a is similar to scenario 400, in that, initially, device database 114 has the same data in both scenarios. Also, the IPList data provided by DHCP server 144 is the same in both scenarios. However as mentioned above, the preventive system maintenance discovery approach is used in scenario 400 to integrate data from IPList into device database 114, while the situational system stabilization discovery approach is used in scenario 400a to integrate data from IPList into device database 114.

At the onset of scenario 400a, device database 114 stores the same data about a printing system similar to printing network 100 that three printing devices: printing device 142, printing device 410, and printing device 420, as discussed above in the context of scenario 400. The contents of device database 114 at the onset of scenario 400*a* are shown in FIG. 4F (which are the same as shown in FIG. 4B).

Scenario 400*a* starts with device state management system 112 requesting IP addresses from DHCP server 144, which are provided to device state management system 112 from DHCP server 144 as a list "IPList". After receiving IPList, device state management system 112 integrates IPList into device database 114. As part of integrating IPList into device database 114, device state management system 112 adds new entries for three IP addresses not already present in device database 114 and updates state information for existing entries based on IPList and sends probe messages to confirm data in device database 114.

Figure 4E:
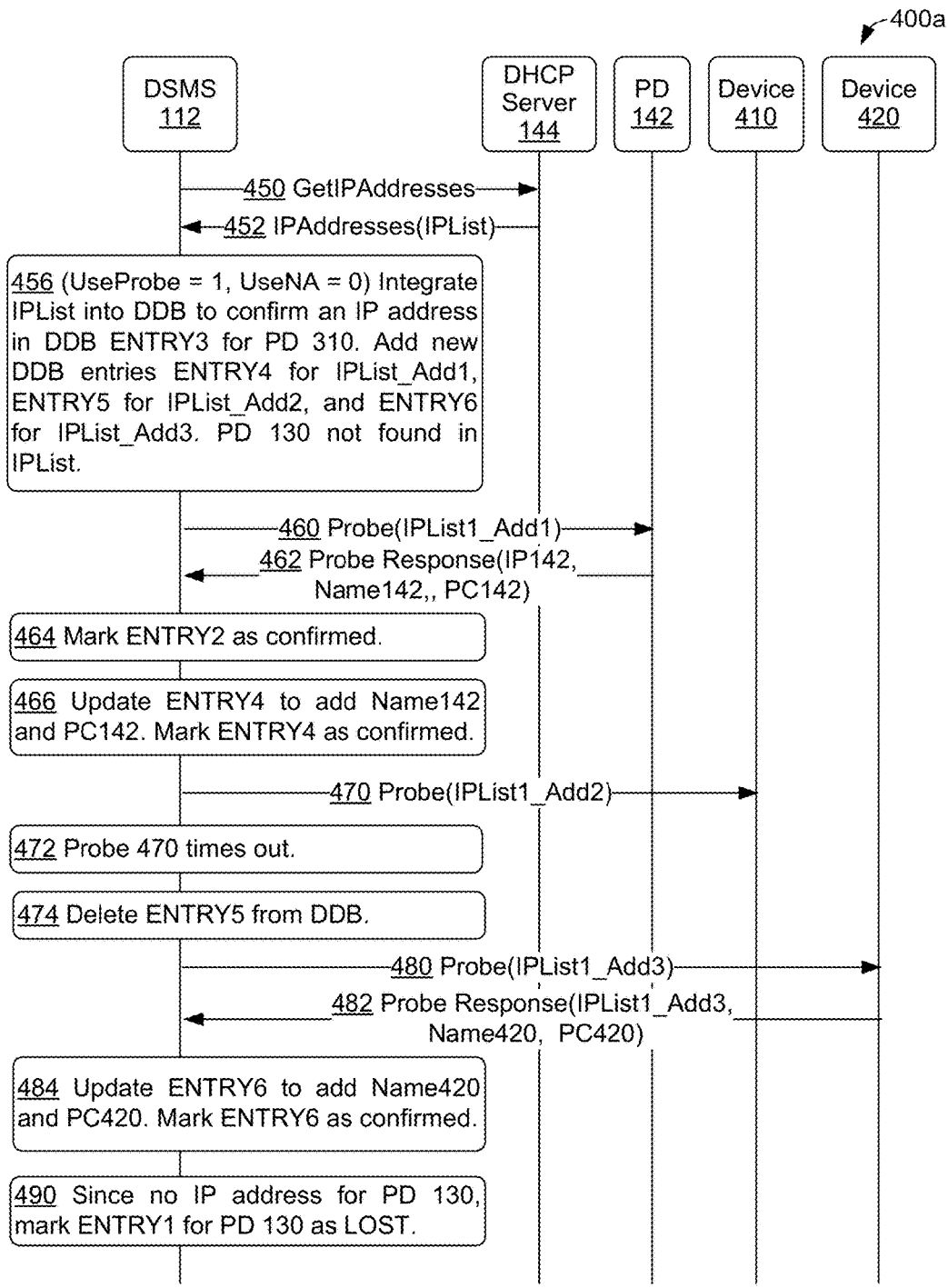

FIG. 4E shows that scenario 400*a* begins with device state management system 112 generating and sending GetIPAddresses message 450 to DHCP server 144. In response to GetIPAddresses message 450, DHCP server 144 generates and sends IPAddresses message 452 with a list of IP addresses "IPList" that are known to DHCP server 144.

Upon reception of IPAddresses message 452, device state management system 112 carries out the procedures of block 456, 464, 466, 472, 474, 484, and 490 to integrate IPList into device database 114. As part of integrating IPList into device database 114, device state management system 112 can query device database 114 with each IP address in IPList to determine whether or not there exists an entry in device database 114 for the queried-for IP address. If such an entry exists, that entry can be considered to be confirmed. Otherwise, as no entry exists for the queried-for IP address, device state management system 112 can add an entry to device database 114 for the queried-for IP address FIG. 4F shows contents of device database 114 prior to the integration of IPList. In particular, device database 114 includes three entries "ENTRY1", "ENTRY2", and "ENTRY3" which store respective IP addresses of "DD_IP130", "DD_IP142", and "DD_IP310", respective device names "PD130", "PD142", and "PD130", respective states of "Need Checking", "Need Checking", and "Need Checking", and respective "Page Count" values of "aaa", "bbb", and "ccc".

FIG. 4G shows the contents of IPList that were returned in IPAddresses message 452 as IPList 434, as the same data discussed above in the context of IPList 434 of FIG. 4C is provided as the "IPList" of IPAddresses message 452. More information about IPList 434 of FIG. 4G is provided in the context of IPList 434 of FIG. 4C, including Table 1.

Returning to FIG. 4E at block 456, device state management system 112 queries device database for IPList1_Add0 from IPList and finds entry ENTRY3 having IP address DD_IP310 that equals IPList1_Add0. As device database 114 has ENTRY3 corresponding to IPList1_Add0 from IPList, device state management system 112 marks a state of ENTRY3 as "Confirmed".

Also at block 456, device state management system 112 adds three new entries to device database 114. More specifically, device state management system 112 queries device database 114 for IPList1_Add1 from IPList and does not find a specific entry for IPList1_Add1. In scenario 400*a*, both IPList1_Add1 from IPList and ENTRY2 in device database 114 are associated with printing device 142, but IPList1_Add1 differs from DD_IP142 stored with ENTRY2 of device database 114. As such, the query for IPList1_Add1 in device database 114 fails. As device database 114 does not have an entry corresponding to IPList1_Add1 from IPList, device state management system 112 adds an entry "ENTRY4" to device database 114 with an IP address of IPList1_Add1, a state of "Need Checking", and sets the device name and page count fields to default values represented as " - - - " in FIG. 4C.

Then, device state management system 112 queries device database 114 for IPList1_Add2 from IPList and does not find a specific entry for IPList1_Add2. In scenario 400, neither IPList1_Add2 nor the associated device 410 is represented by data in device database 114. As such, the query for IPList1_Add2 in device database 114 fails. As device database 114 does not have an entry corresponding to IPList1_Add2 from IPList, device state management system 112 adds an entry "ENTRY5" to device database 114 with an IP address of IPList1_Add2, a state of "Need Checking", and sets the device name and page count fields to default values.

Additionally, device state management system 112 queries device database 114 for IPList1_Add3 from IPList and does not find a specific entry for IPList1_Add3. In scenario 400, neither IPList1_Add3 nor the associated device 420 is represented by data in device database 114. As such, the query for IPList1_Add3 in device database 114 fails. As device database 114 does not have an entry corresponding to IPList1_Add3 from IPList, device state management system 112 adds an entry "ENTRY6" to device database 114 with an IP address of IPList1_Add3, a state of "Need Checking", and sets the device name and page count fields to default values.

After completing adding ENTRY6 to device database 114, device state management system 112 probes devices in IPList. More specifically, device state management system 112 generates and sends probe message 460 to IP address IPList1_Add1, which is an IP address for printing device 142. In response to receiving probe message 460, printing device 142 generates and sends probe response 462 to device state management system 112. Probe response 462 includes "IP142", which is an IP address for printing device 142 that equals IPList1_Add1, "Name142", which is a device name of printing device 142, and "PC142", which is a page count value for printing device 142. In other scenarios, a probe response can include additional and/or different data about printing devices, such as, but not limited to, a serial number for a printing device and a model name/number for the printing device.

At block 464, device state management system 112 examines probe response 462 and queries device database for devices having a device name equal to the value provided as "Name142". In scenario 400*a*, the value of the device name provided by "Name142" is "PD142" and the value provided by "PC142" is "bbb". Upon querying device database 114 for "PD142", device database 114 returns ENTRY2 for printing device 142. Then, device state management system 112 updates ENTRY2 by marking the state field to be "Confirmed" based on the data in probe response 462.

At block 466, device state management system 112 updates ENTRY4 of device database 112, which is an entry added for IP address IPList1_Add1 of IPList, with the device name value of "PD142" and page count value of "bbb" from probe response 462. Then, device state management system 112 updates ENTRY4 by marking the state field to be "Confirmed" based on the data in probe response 462.

Scenario 400*a* continues with device state management system 112 continuing to probe devices in IPList. More specifically, device state management system 112 generates and sends probe message 470 to IP address IPList1_Add2, which is an IP address for device 410. In scenario 400*a*, device 410 does not respond to probe 470, as indicated in FIG. 4E by probe 470 timing out at block 472.

At block 474, device state management system 112 responds to probe 470 timing out by deleting ENTRY5, which was added for IP address IPList1_Add2 from IPList, from device database 114. FIG. 4H shows data for ENTRY5 including a state of "Deleted". In other scenarios, ENTRY5 can be removed from device database 114.

Scenario 400a continues with device state management system 112 continuing to probe devices in IPList. More specifically, device state management system 112 generates and sends probe message 480 to IP address IPList1_Add3, which is an IP address for device 420. In response to receiving probe message 480, device 420 generates and sends probe response 482 to device state management system 112. Probe response 482 includes "IPList1_Add3", which is an IP address for device 420, "Name142", which is a device name of printing device 142, and "PC420", which is a page count value for device 420. Utilizing the data in probe response 482, such as the device name and page count data, device state management system 112 can determine that device 420 is a printing device. In scenario 400a, the value of the device name provided by "Name420" is "PD420" and the value provided by "PC420" is "ddd".

At block 484, device state management system 112 queries device database 114 for device name "PD420", and this query fails, indicating that printing device 420 is a previously unknown printing device that was discovered by probe 480 and probe response 482. Device state management system 112 then updates ENTRY6 of device database 112, which is an entry added for IP address IPList1_Add3 of IPList, with the device name value of "PD420" and page count value of "ddd" from probe response 482. Device state management system 112 can also update ENTRY6 by marking the state field to be "Confirmed".

At block 490, device state management system 112 determines that that the printing device whose device name is "PD130" in ENTRY1 of device database 114 is not represented by an IP address in IPList. Thus, ENTRY1 corresponds to a device that has been lost; e.g., removed from the printing network and/or had enough data about the device changed to render the data stored in ENTRY1 as out of date. Then, device state management system 112 can mark the state of ENTRY1 of device database 114 as "Lost", as indicated in FIG. 4H. In other scenarios, device state management system 112 can delete entries of device database 114 corresponding to lost devices. In still other scenarios, a lost device can be considered to compromise the state of the printing network.

FIG. 4H shows the data in device database 114 at the end of scenario 400. At the end of scenario 400a, only one entry out of five non-deleted entries is not confirmed. In some scenarios, device database 114 can be considered to be stable at this stage of scenario 400 as ⅕th of the data in device database 114 is marked as lost, and ⅘ths of the data is confirmed.

Figure 5A:
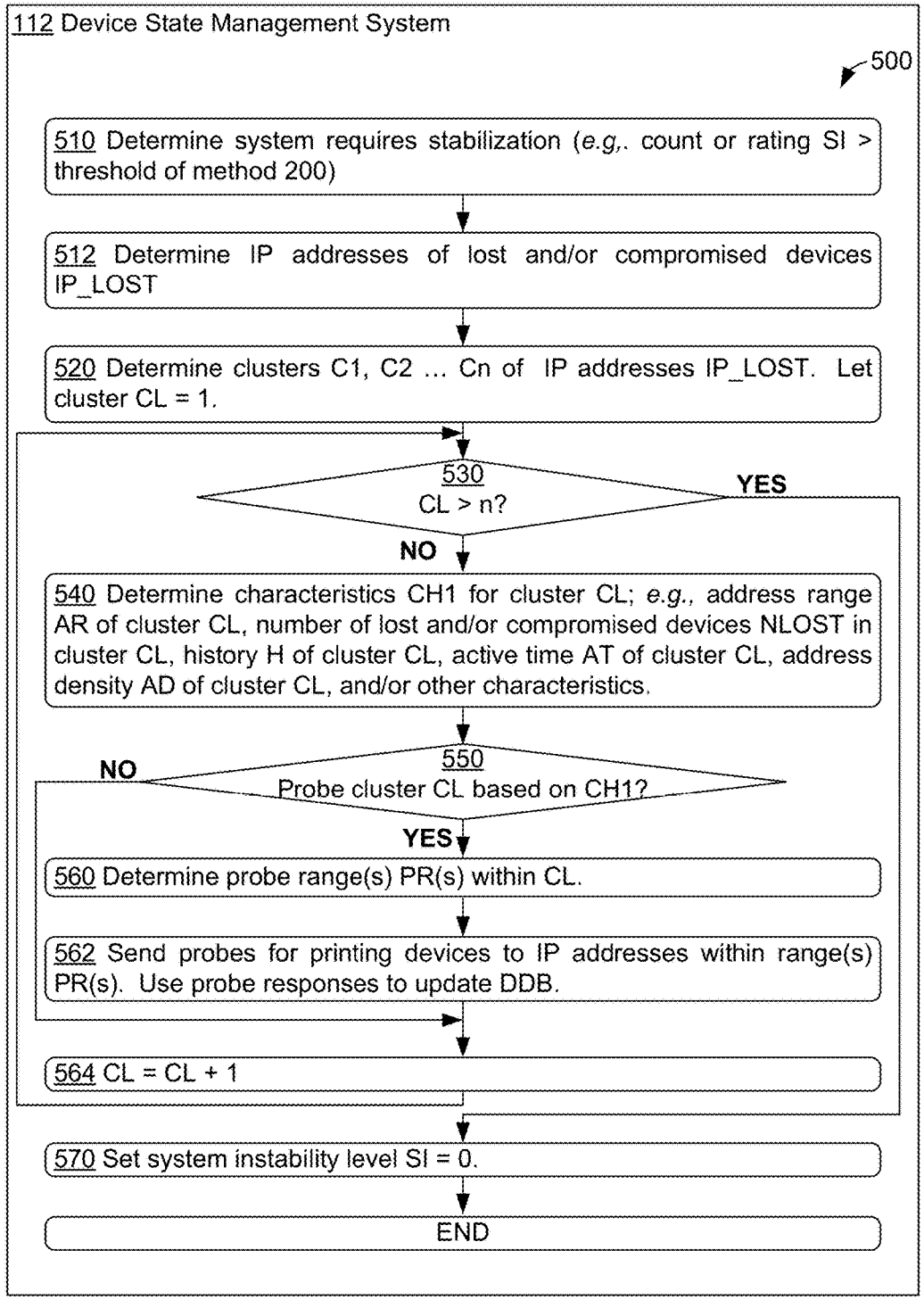
FIG. 5A is a flowchart of a method for stabilizing a printing system, according to an example embodiment.

FIG. 5A is a flowchart of a method 500 for stabilizing a printing system, according to an example embodiment. In some examples, method 500 can be used to perform the functionality of block 292 of method 200 discussed above in the context of FIG. 2B; that is, method 500 can be invoked to stabilize system and/or refresh the device database using probes sent to IP addresses within one or more clusters of IP addresses.

As with method 200, method 500 can be executed by a device state management system, such as device state management system 112. The device state management system can be or include software executed by a computing device, such as computing device 110 discussed above in the context of FIG. 1A and/or computing device 160 discussed above in the context of FIG. 1B.

Method 500 can begin at block 510, where the device state management system can determine that a printing system needs stabilization. For example, if the system-instability value SI of method 200 exceeds threshold Threshold, then the device state management system can determine that the system needs stabilization.

At block 512, after determining that the printing system needs stabilization, the device state management system can determine a list IP_LOST of IP addresses of lost and/or compromised devices. For example, using example data as shown in FIG. 4H, the device state management system can query the device database to retrieve all IP addresses of entries in the database whose state values are "Lost", "Compromised", or "Need Checking"—in the example shown in FIG. 4H, such a query would return one IP address "DD_IP130" as the IP_LOST list. As another example, using example data as shown in FIG. 4D, the device state management system can query the device database to retrieve all IP addresses of entries in the database whose state values are "Lost", "Compromised", or "Need Checking"—in the example shown in FIG. 4D, such a query would return a list of five IP addresses as the IP_LOST list: "DD_IP130", "DD_IP142", "IPList1_Add1", "IPList1_Add2", and "IPList1_Add3". Other example queries and query responses are possible as well.

At block 520, the device state management system can determine n clusters, n>0, shown in FIG. 5A as clusters "C1, C2 . . . Cn" of IP addresses for the IP_LOST list. To determine clusters C1, C2 . . . Cn, a vector quantization algorithm, such as a k-means or a natural breaks algorithm can be used. The k-means algorithm can involve selecting a value k, k>0, representing a number of clusters; i.e., in this example, k=n. Then, each cluster of IP addresses is represented by a mean (average) value for the cluster. For example, suppose the IP addresses are in a range R1 of 10.100.0.0 to 10.100.0.255 for a total range of 256 different IP addresses, and k=n=2. Then, a first cluster C1 can represent the first 128 addresses in that R1, with an initial mean value of 10.100.0.64, and a second cluster C2 can represent the second 128 addresses in R1, with an initial mean value of 10.100.0.192. Another technique for assigning initial means to the n clusters is to select the first n values to be clustered, that, is, values in the IP_LOST list, and assign each of the first n values to one of the C1, C2 . . . Cn clusters. Other techniques for determining initial means are possible as well.

Then, for each IP address I_IN in the IP_LOST address list the k-means algorithm can include first selecting a cluster for I_IN that has the closest mean to I_IN. For example if I_IN=10.100.0.22, then cluster C1 having mean 10.100.0.64 is selected for I_IN, as 10.100.0.64 is closer to 10.100.0.22 than 10.100.0.192 (the mean of cluster C2). Then, I_IN is added to the selected cluster and the mean of the values in the selected cluster is recalculated—that is, after I_IN is added to cluster C1, the new mean can be determined to be the value of I_IN, 10.100.0.22. Then, suppose IP_LIST had a second IP address, 10.100.0.6 to be added to cluster C1. After adding 10.100.0.6 to C1, the mean of C1 can be updated to be (10.100.0.22+0.100.0.6)/2=10.100.0.14. After all of the addresses in the IP_LOST address list have been added to the n clusters, the k-means algorithm can be completed.

A natural breaks algorithm is based on finding inherent clustering in a data set, such as the IP_LOST address list.

Such an inherent clustering can be based on clusters having similar values and with relatively-large differences between clusters. An example of a natural breaks algorithm is the Jenks optimization for univariate (one variable) data, such as the IP addresses in IP_LIST. The Jenks optimization involves making a first attempt to cluster the data into n clusters. This first attempt can be an arbitrary clustering. For example, suppose IP_LIST had NIP values in the list, so cluster C1 could be the first NIP/n values in IP_LIST, cluster C2 could be the second NIP/n values in IP_LIST, and so on, until determining cluster Cn as the last NIP/n values in IP_LIST.

After an (initial) clustering has been determined, the Jenks optimization is an iterative process operating on the clusters of data. That is, calculations must be repeated using different choices of clusters to determine which set of clusters has the smallest in-class variance.

For each iteration of the Jenks optimization, the device state management system can:

1. Calculate the sum of squared deviations from the array (cluster) mean SDAM by determining a mean for each cluster, determining a mean of the cluster means CMEAN, and taking the sum of squares of differences between each cluster mean and the CMEAN value.
2. Calculate the sum of squared deviations between clusters SDBC by determining, for each cluster C_i, a sum SD_i of squares of differences between each cluster mean and each value in the cluster, and then letting SDBC equal a sum of the respective SD_i values over all n clusters.
3. Subtract the SDBC from the SDAM (SDAM-SDBC). This equals the sum of the squared deviations from the class means (SDCM), and.
4. Move one IP address from the cluster having the largest C_i value to the cluster having the smallest C_i value.

As an alternative to iterative processing, all possible cluster combinations may be examined, SDCM calculated for each combination, and the combination with the lowest SDCM selected. Since all break combinations are examined, this guarantees that the one with the lowest SDCM is found. Also, a GVF statistic (goodness of variance fit) can be calculated. GVF is defined as (SDAM−SDCM)/SDAM. GVF ranges from 0 (worst fit) to 1 (perfect fit). Other clustering techniques are possible as well.

Also at block 520, the device state management system can initialize a cluster index value CL equal to 1.

Blocks 530 through 564 are intended to be performed for each cluster C1, C2 . . . Cn. At block 530, the device state management system can determine whether the cluster index value CL is greater than n, which is the total number of clusters. If CL is greater than n, the device state management system can proceed to block 570. Otherwise, CL is less than or equal to n, and the device state management system can proceed to block 540.

At block 540, the device state management system can determine one or more characteristics CH1 of cluster CL. The characteristics CH1 can include, but are not limited to, a range of addresses AR for cluster CL, a number of lost devices, compromised devices, and/or devices that need checking in cluster CL, historical information about cluster CL (e.g., information about previous counts of addresses with lost/compromised devices, specific addresses in cluster CL that have had lost/compromised devices, etc.), an active time AT of cluster CL, and an address density AD of cluster CL.

An active time AT of cluster CL can be determined as an amount of time that one or more devices within an address range of cluster CL have been lost, compromised, and/or needed checking. For example, an active time AT can be determined based on a longest time since a device within a cluster has been determined to be lost, compromised and/or needed checking, an average time for all devices within the cluster have been determined to be lost, compromised and/or needed checking, or some other value representing an amount time since one or more devices within the cluster have been marked as lost, compromised and/or needed checking.

The address density AD of a cluster C can be determined as:

$$AD=NLF/NAC,$$

where:
NLF=a number of lost/compromised devices within cluster C, and
NAC=a number of addresses in the cluster.

The NAC value can be determined as: NAC=AR_HI−AR_LO+1, where AR_HI is the highest IP address in address range AR for the cluster, and AR_LO is the lowest IP address in address range AR, and where AR_HI is assumed to be greater than or equal to AR_LO.

At block 550, the device state management system can determine whether to probe cluster CL based on characteristics CL1. If the device state management system determines to probe cluster CL, the device state management system can proceed to block 560. Otherwise, the device state management system determines not to probe cluster CL and can proceed to block 564.

Generally speaking, clusters with relatively-small address ranges/numbers of addresses are more likely to be probed that clusters with relatively-large address ranges. Also, clusters with relatively-large numbers of lost devices, compromised devices, and/or devices that need checking are more likely to be probed than clusters with relatively-small numbers of lost/compromised devices. As such, clusters with relatively-high address density AD values are more likely to be probed than clusters with relatively-low address density AD values, as clusters with high AD values have a relatively-large number of lost/compromised devices per cluster address. Further, clusters with relatively-high active time AT values are more likely to be probed, as having relatively stale information, than clusters with relatively-low active time AT values.

Figure 5B:
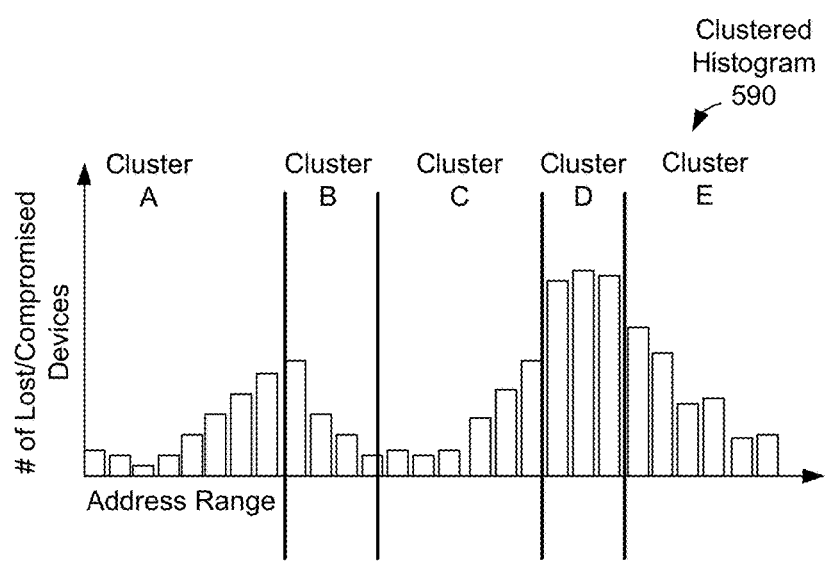
FIG. 5B illustrates example clusters of addresses of lost and/or compromised printing devices of a printing system and example probe decisions for the clusters of addresses, according to an example embodiment.

FIG. 5B illustrates a histogram 590 related to clusters of addresses of lost and/or compromised printing devices of a printing system and probe decisions 592 for the clusters of addresses, according to an example embodiment. In the example shown in FIG. 5B, an IP address range of five clusters (n=5) have been determined. Histogram 590 shows the address value increasing along an X axis and a number of lost and/or compromised devices within the address range along a Y axis—a taller (or shorter) bar in histogram 590 indicates a larger (or smaller) number of lost and/or compromised devices within a particular portion of the IP address range represented by the bar.

Based on the characteristics CL1 determined for each of the five clusters—Clusters A, B, C, D, and E—shown in FIG. 5B, a probe decision can be determined at block 550 and refined and block 560. The probe decision made at block 550 can be to determine whether to probe any portion a cluster. For example, cluster A is a relatively large cluster in terms of address range, but has a relatively small number of lost/compromised devices relative to other clusters, such as cluster D. Therefore, based on the large address range and perhaps the small number of lost/compromised devices, the probe decision for cluster A is to not probe the cluster. As such, blocks 560 and 562 of method 500 would not be executed for cluster A. A similar calculation, based on address density AD of cluster C can be determined.

Returning to FIG. 5A, at block 560, the device state management system can determine one or more probe ranges with cluster CL. Block 560 relates to the concept that all probed clusters are not treated indiscriminately. Clusters can vary in the level of compromised severity based on one on more the characteristics CH1 for the cluster. Due to this variance in severity, target ranges from a cluster centroid, or mean value, can be calculated with regard to the properties used to classify it.

In the example shown in FIG. 5B, probe decisions 592 indicate that clusters B, D, and E of histogram 590 are to be probed, and so blocks 560 and 562 of method 500 would be executed for these clusters. For cluster B, at block 560, the device state management system can determine that cluster D has a smaller cluster range and a higher number of lost/compromised devices within the cluster and could benefit from full discovery where each address in cluster D is probed. However, partial discovery can suffice for Classes B and E. For cluster B, the lower half of the range has a relatively large number of lost/compromised devices, and so at block 560, the device state management system can determine that a probe range including the lower half of cluster B is to be probed. Similarly, for cluster E, the lower $\frac{2}{3}^{rd}$ of the address range has a relatively large number of lost/compromised devices, and so the device state management system can determine that a probe range including the lower $\frac{2}{3}^{rd}$ of cluster E is to be probed. Other probe decisions are possible as well.

Returning to FIG. 5A, at block 562, the device state management system can send one or more probe messages to IP addresses with the probe range(s) for cluster CL determined at block 560. After sending the probe message(s), the device state management system can await and perhaps receive one or more probe responses to the probe messages. In some examples, probe messages can be sent from the middle out as discussed above in the context of at least block 356 of FIG. 3B. Upon reception of the probe responses, the device state management system can update the device database based on data in the probe messages, such as discussed above at least in the context of FIGS. 3A-4H.

At block 564, the device state management system can increment the cluster index value CL by one. After incrementing CL, the device state management system can proceed to block 530.

At block 570, the device state management system can reset the system-instability value SI; i.e., set SI=0. Upon completion of the procedures of block 570, method 500 can be completed.

IV. Example Methods of Operation

Figure 6:
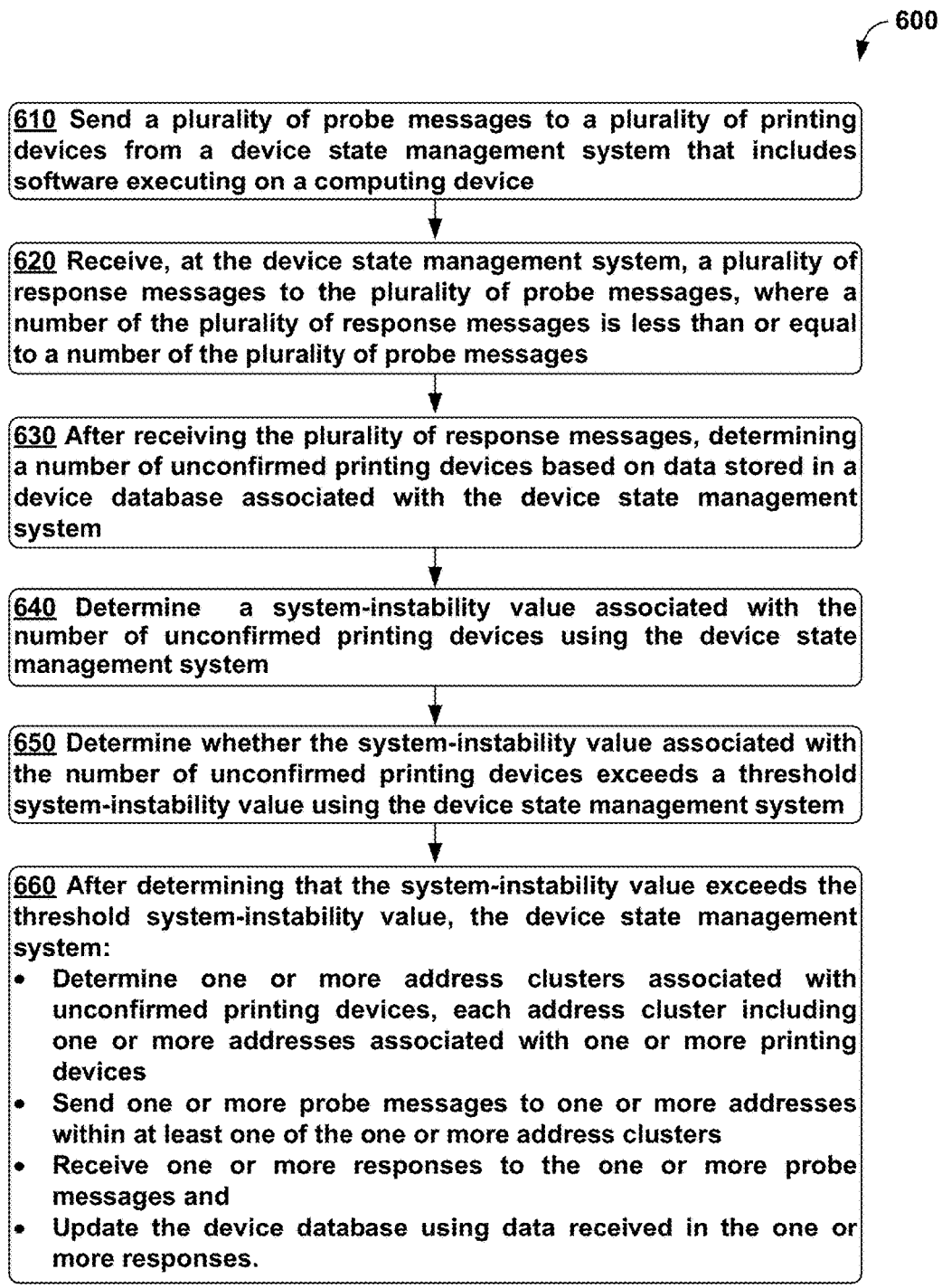
FIG. 6 shows a flowchart for a method, according to an example embodiment.

FIG. 6 shows a flowchart for method 600, according to an example embodiment. Method 600 can be carried out by a device state management system. The device state management system can be implemented in software executable by a computing device, such as computing device 110 and/or computing device 160.

Method 600 can begin at block 610, where the device state management system can send a plurality of probe messages to a plurality of printing devices, such as discussed above at least in the context of FIGS. 2A-3B and 4E-5A.

At block 620, the device state management system can receive a plurality of response messages to the plurality of probe messages, where a number of the plurality of response messages is less than or equal to a number of the plurality of probe messages, such as discussed above at least in the context of FIGS. 2A-3B and 4E-5A.

At block 630, after receiving the plurality of response messages, a number of unconfirmed printing devices can be determined based on data stored in a device database associated with the device state management system, such as discussed above at least in the context of FIGS. 2A-3B. In some embodiments, the device database associated with the device state management system can store, for a particular printing device of the one or more printing devices: a serial number for the particular printing device; a model name for the particular printing device; and a network address for the particular printing device, such as discussed above at least in the context of FIGS. 2A-3C. In particular of these embodiments, the device database associated with the device state management system can further store, for the particular printing device, a device activity level for the particular printing device, such as discussed above at least in the context of FIGS. 2A-3C.

At block 640, the device state management system can determine a system-instability value associated with the number of unconfirmed printing devices, such as discussed above at least in the context of FIGS. 2A-3B. In some embodiments, determining the system-instability value associated with the number of unconfirmed printing devices can include: determining a particular response message of the plurality of response messages that is associated with a particular printing device; determining whether a response-message serial number in the particular response message differs from a serial number for the particular printing device from the device database; and after determining that the response-message serial number in the particular response message differs from the serial number for the particular printing device from the device database, increasing the system-instability value, such as discussed above at least in the context of FIGS. 2A-3B.

At block 650, the device state management system can determine whether the system-instability value associated with the number of unconfirmed printing devices exceeds a threshold system-instability value using the device state management system, such as discussed above at least in the context of FIGS. 2A-3B. In some embodiments, the system-instability value associated with the number of unconfirmed printing devices can include the number of unconfirmed printing devices, and the threshold system-instability value can include a threshold number of unconfirmed printing devices, such as discussed above at least in the context of FIGS. 2A-3B.

At block 660, after determining that the system-instability value exceeds the threshold system-instability value, the device state management system can: determine one or more address clusters associated with unconfirmed printing devices, each address cluster including one or more addresses associated with one or more printing devices; send one or more probe messages to one or more addresses within at least one of the one or more address clusters; receive one or more responses to the one or more probe messages; and update the device database using data received in the one or more responses, such as discussed above at least in the context of FIGS. 2A-3B, 5A, and 5B.

In some embodiments, determining the one or more address clusters associated with unconfirmed printing devices can include determining the one or more address clusters associated with unconfirmed printing devices using a vector quantization technique, such as discussed above at least in the context of FIGS. 5A and 5B. In other embodiments, determining the one or more address clusters associated with unconfirmed printing devices can include determining the one or more address clusters associated with unconfirmed printing devices using a natural breaks technique, such as discussed above at least in the context of FIGS. 5A and 5B.

In still other embodiments, sending the one or more probe messages to the one or more addresses within at least one of the one or more address clusters can include: selecting a first cluster of the one or more address clusters based on a number of unconfirmed printing devices whose addresses are within the first cluster; and sending one or more probe messages to one or more addresses within the first cluster, such as discussed above at least in the context of FIGS. 2B, 3A, 3B, 5A, and 5B. In some of these embodiments, selecting the first cluster of the one or more address clusters can include selecting the first cluster based on a density of unconfirmed printing devices whose addresses are within the first cluster; where the density of unconfirmed printing devices whose addresses are within the first cluster is based on the number of unconfirmed printing devices whose addresses are within the first cluster, such as discussed above at least in the context of FIGS. 5A and 5B.

In even other embodiments, sending one or more probe messages to one or more addresses within at least one of the one or more address clusters can include: determining a midpoint address of the one or more addresses within at least one of the one or more address clusters; and sending the one or more probe messages to the one or more addresses starting with the midpoint address, such as discussed above at least in the context of FIGS. 3A and 3B. In particular of these embodiments, sending the one or more probe messages to the one or more addresses starting with the midpoint address can include sending the one or more probe messages to the one or more addresses starting with the midpoint address in an order that includes: sending a probe message to the midpoint address and then sending a probe message to an address adjacent to the midpoint address, such as discussed above at least in the context of FIGS. 3A and 3B. In more particular of these embodiments, the address adjacent to the midpoint address can be one of: an address immediately after the midpoint address and an address immediately preceding the midpoint address, such as discussed above at least in the context of FIGS. 3A and 3B.

In some embodiments, method 600 can further include: sending an address-request message from the device state management system; in response to the address-request message, receiving one or more network addresses associated with the plurality of printing devices; and updating the device database based on the received one or more network addresses, such as discussed above at least in the context of FIGS. 2A-4H. In some of these embodiments, sending the address-request message from the device state management system can include sending an address-request message from the device state management system to a Dynamic Host Configuration Protocol (DHCP) server, such as discussed above at least in the context of FIGS. 2A-4H. In other of these embodiments, determining the number of unconfirmed printing devices based on data stored in the device database associated with the device state management system includes: determining a particular network address of the received one or more network addresses; determining whether the device database does not store data associated with the particular network address; and after determining that the device database does not store data associated with the particular network address, incrementing the number of unconfirmed printing devices, such as discussed above at least in the context of FIGS. 2A-3B.

In other embodiments, method 600 can further include: determining a device activity level for each printing device in the plurality of printing devices using the device state management system, such as discussed above at least in the context of FIGS. 2A and 2B. In some of these embodiments, determining the system-instability value associated with the number of unconfirmed printing devices can include determining the system-instability value associated with the number of unconfirmed printing devices based on the device activity levels of the number of unconfirmed printing devices, and the threshold system-instability value can include a threshold value that is based on device activity levels, such as discussed above at least in the context of FIGS. 2A and 2B. In still other embodiments, method 600 can further include: generating an order for replaceable supplies for a printing device based on data stored in the device database associated with the device state management system, such as discussed above at least in the context of FIGS. 2A and 2B.

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
    sending a plurality of probe messages to a plurality of printing devices from a device state management system that comprises software executing on a computing device, wherein each printing device of the plurality of printing devices is associated with a network address;
    receiving, at the device state management system, a plurality of response messages to the plurality of probe messages, wherein a number of the plurality of response messages is less than or equal to a number of the plurality of probe messages;
    after receiving the plurality of response messages, determining a number of unconfirmed printing devices based on data stored in a device database associated with the device state management system;
    determining a system-instability value associated with the number of unconfirmed printing devices using the device state management system;
    determining whether the system-instability value associated with the number of unconfirmed printing devices exceeds a threshold system-instability value using the device state management system; and
    after determining that the system-instability value exceeds the threshold system-instability value, the device state management system:
        determining one or more address clusters associated with the number of unconfirmed printing devices, each address cluster comprising one or more network addresses associated with one or more printing devices of the number of unconfirmed printing devices;
        sending one or more probe messages to one or more network addresses within at least one of the one or more address clusters;
        receiving one or more responses to the one or more probe messages; and
        updating the device database using data received in the one or more responses.

2. The method of claim 1, further comprising:
    sending an address-request message from the device state management system;
    in response to the address-request message, receiving one or more network addresses associated with the plurality of printing devices; and
    updating the device database based on the received one or more network addresses.

3. The method of claim 2, wherein sending the address-request message from the device state management system comprises sending the address-request message from the device state management system to a Dynamic Host Configuration Protocol (DHCP) server.

4. The method of claim 2, wherein determining the number of unconfirmed printing devices based on data stored in the device database associated with the device state management system comprises:
    determining a particular network address of the received one or more network addresses;
    determining whether the device database does not store data associated with the particular network address; and
    after determining that the device database does not store data associated with the particular network address, incrementing the number of unconfirmed printing devices.

5. The method of claim 1, wherein the system-instability value associated with the number of unconfirmed printing devices comprises the number of unconfirmed printing devices, and wherein the threshold system-instability value comprises a threshold number of unconfirmed printing devices.

6. The method of claim 1, further comprising:
    determining a device activity level for each printing device of the plurality of printing devices using the device state management system.

7. The method of claim 6, wherein determining the system-instability value associated with the number of unconfirmed printing devices comprises determining the system-instability value associated with the number of unconfirmed printing devices based on device activity levels for the number of unconfirmed printing devices, and wherein the threshold system-instability value comprises a threshold value that is based on one or more device activity levels of the device activity levels determined for the plurality of printing devices.

8. The method of claim 1, wherein the device database associated with the device state management system stores, for a particular printing device of the one or more printing devices:
    a serial number for the particular printing device;
    a model name for the particular printing device; and
    a network address for the particular printing device.

9. The method of claim 8, wherein the device database associated with the device state management system further stores, for the particular printing device, a device activity level for the particular printing device.

10. The method of claim 1, wherein determining the system-instability value associated with the number of unconfirmed printing devices comprises:
    determining a particular response message of the plurality of response messages that is associated with a particular printing device;
    determining whether a response-message serial number in the particular response message differs from a serial number for the particular printing device from the device database; and
    after determining that the response-message serial number in the particular response message differs from the serial number for the particular printing device from the device database, increasing the system-instability value.

11. The method of claim 1, wherein determining the one or more address clusters associated with the number of unconfirmed printing devices comprises determining the one or more address clusters associated with the number of unconfirmed printing devices using a vector quantization technique.

12. The method of claim 1, wherein determining the one or more address clusters associated with the number of unconfirmed printing devices comprises determining the one or more address clusters associated with the number of unconfirmed printing devices using a natural breaks technique.

13. The method of claim 1, wherein sending the one or more probe messages to the one or more network addresses within at least one of the one or more address clusters comprises:
    selecting a first cluster of the one or more address clusters based on a number of unconfirmed printing devices whose network addresses are within the first cluster; and
    sending one or more probe messages to one or more network addresses within the first cluster.

14. The method of claim 13, wherein selecting the first cluster of the one or more address clusters comprises selecting the first cluster based on a density of unconfirmed printing devices whose network addresses are within the first cluster; and
    wherein the density of unconfirmed printing devices whose network addresses are within the first cluster is based on the number of unconfirmed printing devices whose network addresses are within the first cluster.

15. The method of claim 1, wherein sending one or more probe messages to one or more network addresses within at least one of the one or more address clusters comprises:
    determining a midpoint address of the one or more network addresses within at least one of the one or more address clusters; and
    sending the one or more probe messages to the one or more network addresses starting with the midpoint address.

16. The method of claim 15, where sending the one or more probe messages to the one or more network addresses starting with the midpoint address comprises sending the one or more probe messages to the one or more network addresses starting with the midpoint address in an order that includes: sending a probe message to the midpoint address and then sending a probe message to a network address adjacent to the midpoint address.

17. The method of claim 16, wherein the network address adjacent to the midpoint address is one of: a network address immediately after the midpoint address and a network address immediately preceding the midpoint address.

18. The method of claim 1, further comprising:
    generating an order for replaceable supplies for a printing device based on data stored in the device database associated with the device state management system.

19. A computing device, comprising:
    one or more processors; and
    data storage configured to store at least computer-readable instructions that comprise instructions for a device state management system and that, when executed by the one or more processors, cause the computing device to perform tasks comprising:
        sending a plurality of probe messages to a plurality of printing devices from the device state management system, wherein each printing device of the plurality of printing devices is associated with a network address;
        receiving, at the device state management system, a plurality of response messages to the plurality of probe messages, wherein a number of the plurality of response messages is less than or equal to a number of the plurality of probe messages;
        after receiving the plurality of response messages, determining a number of unconfirmed printing devices based on data stored in a device database associated with the device state management system;
        determining a system-instability value associated with the number of unconfirmed printing devices using the device state management system;
        determining whether the system-instability value associated with the number of unconfirmed printing devices exceeds a threshold system-instability value using the device state management system; and
        after determining that the system-instability value exceeds the threshold system-instability value, the device state management system:
            determining one or more address clusters associated with the number of unconfirmed printing devices, each address cluster comprising one or more network addresses associated with one or more printing devices of the number of unconfirmed printing devices;
            sending one or more probe messages to one or more network addresses within at least one of the one or more address clusters;
            receiving one or more responses to the one or more probe messages; and
            updating the device database using data received in the one or more responses.

20. An article of manufacture comprising non-transitory data storage storing at least computer-readable instructions that comprise instructions for a device state management system and that, when executed by one or more processors of a computing device, cause the computing device to perform tasks comprising:
    sending a plurality of probe messages to a plurality of printing devices from the device state management system, wherein each printing device of the plurality of printing devices is associated with a network address;
    receiving, at the device state management system, a plurality of response messages to the plurality of probe messages, wherein a number of the plurality of response messages is less than or equal to a number of the plurality of probe messages;
    after receiving the plurality of response messages, determining a number of unconfirmed printing devices based on data stored in a device database associated with the device state management system;
    determining a system-instability value associated with the number of unconfirmed printing devices using the device state management system;
    determining whether the system-instability value associated with the number of unconfirmed printing devices exceeds a threshold system-instability value using the device state management system; and
    after determining that the system-instability value exceeds the threshold system-instability value, the device state management system:
        determining one or more address clusters associated with the number of unconfirmed printing devices, each address cluster comprising one or more network addresses associated with one or more printing devices of the number of unconfirmed printing devices;
        sending one or more probe messages to one or more network addresses within at least one of the one or more address clusters;

receiving one or more responses to the one or more probe messages; and updating the device database using data received in the one or more responses.

* * * * *